United States Patent
Hegar et al.

(10) Patent No.: US 10,310,928 B1
(45) Date of Patent: Jun. 4, 2019

(54) DYNAMIC SELECTION OF MULTIMEDIA SEGMENTS USING INPUT QUALITY METRICS

(71) Applicant: Amazon Technologies, Inc., Seattle, WA (US)

(72) Inventors: Ryan Paul Hegar, Happy Valley, OR (US); Khawaja Salman Shams, Portland, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 226 days.

(21) Appl. No.: 15/469,856

(22) Filed: Mar. 27, 2017

(51) Int. Cl.
  *G06F 15/173* (2006.01)
  *G06F 11/07* (2006.01)
  *G06F 3/06* (2006.01)

(52) U.S. Cl.
  CPC ........ *G06F 11/0784* (2013.01); *G06F 3/0635* (2013.01)

(58) Field of Classification Search
  CPC .................................................. G06F 15/173
  USPC ........................................................ 709/238
  See application file for complete search history.

(56) References Cited

U.S. PATENT DOCUMENTS

| | | | | |
|---|---|---|---|---|
| 7,802,286 B2* | 9/2010 | Brooks | ............ | H04N 21/23439 725/101 |
| 2003/0035488 A1 | 2/2003 | Barrau | | |
| 2006/0018254 A1* | 1/2006 | Sanders | ............. | H04N 21/2365 370/216 |
| 2006/0215767 A1* | 9/2006 | Gomila | ................... | G06T 5/002 375/240.25 |
| 2014/0140417 A1* | 5/2014 | Shaffer | ............ | H04N 21/23608 375/240.28 |
| 2014/0187239 A1* | 7/2014 | Friend | ..................... | H04L 29/08 455/426.1 |
| 2015/0100315 A1* | 4/2015 | Bianco | .............. | H04M 3/42391 704/235 |
| 2015/0172680 A1* | 6/2015 | Zhou | ..................... | H04N 19/14 375/240.06 |
| 2015/0229989 A1* | 8/2015 | Gavade | .................. | H04N 19/46 725/31 |
| 2015/0261600 A1 | 9/2015 | Iturralde et al. | | |
| 2015/0281746 A1* | 10/2015 | Lam | ................... | H04N 21/2368 725/116 |
| 2016/0105689 A1* | 4/2016 | Sorlander | .......... | H04N 21/6143 375/240.27 |
| 2017/0048564 A1* | 2/2017 | Roujansky | ....... | H04N 21/23424 |

(Continued)

*Primary Examiner* — Brian Whipple
*Assistant Examiner* — Hannah S Wang
(74) *Attorney, Agent, or Firm* — Davis Wright Tremaine LLP; Timothy Chou

(57) ABSTRACT

Multimedia input may be received by two or more transcoders. A primary transcoder may transcode the multimedia input and generate a first multimedia output segment having a first segment quality metric based at least in part on errors detected as part of the transcoding process. A second transcoder may transcode the multimedia input and generate a redundant second multimedia output segment encoded with a segment quality metric. The segment quality metrics may be encoded in a manifest file associated with each particular segment. A multimedia delivery platform may receive redundant segments from two or more transcoders and select, among the redundant segments, a segment to provide to a downstream entity based at least in part on the quality metric of the segments.

20 Claims, 17 Drawing Sheets

(56) References Cited

U.S. PATENT DOCUMENTS

| | | |
|---|---|---|
| 2017/0237794 A1* | 8/2017 | Jarvi ............... H04L 65/607 |
| | | 709/203 |
| 2017/0237987 A1 | 8/2017 | Seigneurbieux |
| 2017/0338996 A1* | 11/2017 | Sankar ............... H04L 27/20 |
| 2018/0020036 A1* | 1/2018 | Ramamurthy ...... H04L 65/4092 |
| 2018/0184143 A1 | 6/2018 | Davis et al. |
| 2018/0367823 A1 | 12/2018 | Brinkley et al. |
| 2018/0367847 A1 | 12/2018 | Brinkley et al. |

* cited by examiner

DYNAMIC SELECTION OF MULTIMEDIA SEGMENTS USING INPUT QUALITY METRICS

CROSS-REFERENCE TO RELATED APPLICATIONS

This application incorporates by reference for all purposes the full disclosure of co-pending U.S. patent application Ser. No. 15/469,884, filed Mar. 27, 2017, entitled "ASYNCHRONOUS ENHANCEMENT OF MULTIMEDIA SEGMENTS USING INPUT QUALITY METRICS" and U.S. patent application Ser. No. 14/469,849, filed Mar. 27, 2017, entitled "QUALITY CONTROL SERVICE USING INPUT QUALITY METRICS".

BACKGROUND

Customers and other users often access a digital content provider to stream a variety of digital content. Upon request, the digital content provider may stream the digital content onto a customer's computing device, thereby enabling the customer to access and use the digital content through their own computing device. However, as digital content becomes available, many customers may transmit requests to the digital content provider, causing the digital content provider to provide the newly available digital content to these customers simultaneously. This may significantly increase the network load for the digital content provider. Thus, digital content providers may need to upgrade their network capabilities and bandwidth to handle such demand for new digital content which, in turn, may increase the operational and infrastructure costs for the digital content providers.

In complex systems, multiple encoders, transcoders, and the like may be used to serve multimedia in a multitude of formats. In such environments, there exist challenges in determining how to best serve high-quality multimedia, how to correct transcoding errors, and how to detect abnormal behavior of components when so many components are used in an intertwined manner.

BRIEF DESCRIPTION OF THE DRAWINGS

Various techniques will be described with reference to the drawings, in which.

DETAILED DESCRIPTION

Figure 1:
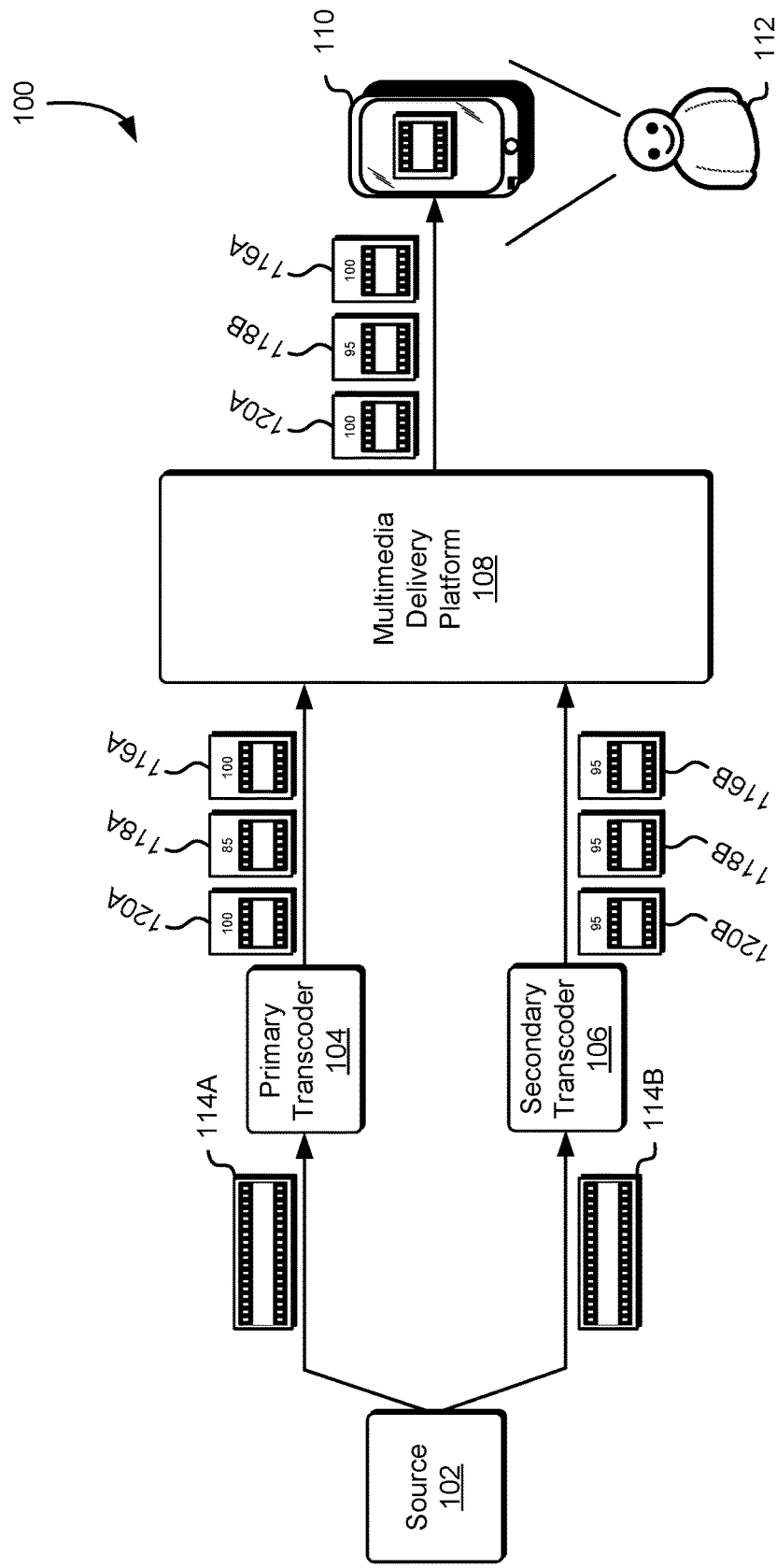
FIG. 1 illustrates an environment in which various embodiments can be implemented.

A computing environment may include a multimedia source, at least two transcoders that receive multimedia inputs from the source, and a multimedia delivery platform that receives multimedia output segments from the transcoders. The multimedia source may be a feed directly from a camcorder or other recording device that is connected to a network which is used to transmit the feed to one or more transcoders and/or encoders. In some examples, the source provides multimedia content as a single, contiguous block of data (e.g., an entire MPEG-4 file provided to a transcoder) or may be provided as one or more discrete blocks (e.g., real-time stream continuously buffers 2-seconds of broadcasting and provides the stream in 2-second segments to a transcoder). The multimedia source may be transmitted over a network to one or more transcoders. For the purposes of this discussion, transcoders will be used in connection with various examples and embodiments, but it should be noted that the use of encoders, where appropriate, is also contemplated. A transcoder may be used to transcode digital media received in one encoding format into digital media of a second encoding format of one or more encoding formats—for example, to transcode media from one digital format to another format that is suitable for use by a multimedia delivery platform. As part of transcoding multimedia content received from a source, the transcoder may: re-encode an input media source from one compressed format to another; re-encode the media from one bitrate to another; resize the video from one resolution to another; change the aspect ratio of video; compress the media using a compression algorithm; change the framerate of the video; and any combination thereof. Transcoders and encoders may be used to implement additional functionality. In some embodiments, multimedia content may be duplicated to two or more source streams, and a first source stream may provide a first multimedia content input to a first transcoder/encoder, and a second source stream may provide a second multimedia content input to a second transcoder/encoder.

A multimedia segment may include audiovisual media. A segment may include: one or more visual frames that, when assembled together, form a video; audio sound for the segment; and a manifest. A segment may, furthermore, include other data such as captions or teletext which may affect the quality metric associated with the segment. The manifest may include metadata that is used by a playback device to determine how to render the audiovisual information. The manifest may include information such as the frame rate, codec, sequence information, bitrate, etc., of the media included in the segment. A transcoder may assign, to a segment, a quality metric based on one or more factors that potentially impact the quality of the transcoded output. These factors may include whether an input packet error was detected; whether a decoding error was detected; whether there was insufficient or unsatisfactory computing resources available; whether a frame error was detected; and more. The segment quality metric may be thought of, generally, as the overall quality of a segment and attest to a quantitative measure of how well the transcoded output reproduced the media content provided by the source. Additionally, frames of a segment and/or audio data of a segment may include additional metadata such as quality metrics for individual frames and/or audio components. A quality metric may be a quality score such as a single numeric value that encapsulates a holistic evaluation of the segment as a whole but may also include more detailed information, such as metadata regarding how a quality metric may have been negatively affected. For example, metadata for a segment indicates that there was an input packet error that caused one or more frames of the segment to not be received by the transcoder. The individual frames may further indicate where the input packet error occurred—for example, a frame with no audio-visual data or placeholder data (e.g., a default slate) may have metadata indicating an input packet error.

Multimedia segments may include video and/or audio information for at least part of some multimedia source content. A segment may include one or more frames that may be assembled to be playable as a video. In some embodiments, a frame includes frame metric metadata that includes information regarding the quality of the frame. A numeric value may be attached to the frame metric, as well as information that indicates an error in the frame. For example, an error that occurred while transcoding a particular frame is encoded as metadata in that frame, which is used during a polishing, enhancing, or correcting routine to improve the quality of the frame, perhaps by re-encoding the segment from the source. Additional types of errors that may be indicated in the frame metric metadata may include input packet errors, decoding errors, and suboptimal encoding due to insufficient computing cycles. Audio data may also be included as part of a segment and may be compressed audio, such as MP3 audio. A manifest may be associated with a multimedia segment and may be in accordance with various protocols and standards such as the HTTP Live Streaming (HLS) protocol. A manifest may include metadata associated with the multimedia segment such as a segment quality metric.

In some systems, a multimedia input may be transcoded into multiple formats, encodings, resolutions, etc., which may allow for greater flexibility to downstream components to serve the most appropriate format of multimedia content. Furthermore, some systems may use two or more transcoders to transcode the same content to the same encoding format. For example, a multimedia input may be provided to a first transcoder and a second transcoder to generate redundant multimedia segments of the same encoding format. Systems may utilize these redundant streams to increase reliability of the stream—if the primary transcoder fails, a secondary transcoder is available to continue providing multimedia output to downstream entities such as a multimedia delivery platform.

A multimedia delivery platform may receive multimedia from one or more transcoders and perform various operations using the received multimedia. As an example, a multimedia delivery platform may receive multiple copies of a multimedia segment from various transcoders and/or encoders in various encoding formats. The multimedia delivery platform may, furthermore, receive two or more redundant streams with the same encoding. For example, a primary transcoder and a secondary transcoder may provide redundant multimedia segments of the same resolution, audio quality, etc., to the multimedia delivery platform. Continuing with the embodiment, the multimedia delivery platform receives two or more redundant streams and selects, among the redundant segments, the segment with the best quality metric and delivers that segment to a downstream entity such as a content delivery network (CDN).

In some cases a multimedia delivery platform may improve the quality of an on-demand video segment over the quality of the live segment. The computing environment includes a primary transcoder, a secondary transcoder, a multimedia delivery platform, and a multimedia repository. Generally speaking, slightly degrading the quality of a segment and providing it within real-time performance constraints is preferable to a delay in serving the segment which results in buffering or delaying the multimedia stream. Therefore, in many cases, a transcoder may use a lower quality transcoding algorithm that is faster if it determines that there is not enough time to use a higher quality algorithm to meet real-time performance constraints. As an example, the primary transcoder may suffer from some of the degradation factors resulting in a decrease in segment quality metrics of transcoded segments.

A multimedia delivery platform may be configured to receive two or more redundant segments, inspect the quality metric of the two or more redundant segments, select the segment with the best quality metric, and provide the selected segment to a downstream entity such as a CDN or a multimedia playback device requesting the media. The multimedia delivery platform may be configured to wait for a determined amount of time for the redundant segments to arrive before performing the selection of a segment with the best quality metric. The amount of time that the multimedia delivery platform waits may be determined at least in part based on network traffic conditions and may be based on latency, bandwidth, and other factors that may affect how long it is expected for the segment to be received by the downstream entity (e.g., a CDN) after a segment is selected and transmitted by the multimedia delivery platform. The multimedia delivery platform may be configured so that it will select a redundant segment with the best quality metric even if some transcoders have not finished transcoding the same segment.

In some embodiments, the segments that are selected by the multimedia delivery platform may be stored in a multimedia repository. Playback quality for multimedia may be improved using the multimedia delivery platform even when segments are delayed and not received by the multimedia delivery platform in compliance with real-time performance constraints. In some embodiments, a delayed segment is received by the multimedia delivery platform after the multimedia delivery platform has performed the selection of the segment to be transmitted (e.g., to a CDN). In such a case, the quality of catch-up and on-demand media may be improved by access to the media repository and replacing the transmitted and stored segment with a higher quality segment. Thus, when a viewer at a later point in time requests to view the media, the multimedia playback device may receive a higher quality segment as a result of the replacement discussed above. An on-demand video may be, for example, a video that is stored at a point in time and played at a point in time afterwards when requested. Catch-up media may refer to, for example, providing media for a broadcast that was paused (e.g., a live broadcast may have been paused by the viewer who wants the broadcast to be resumed at a later point in time). The improvements described herein to serve media segments apply either the same or substantially the same to both on-demand and catch-up playback.

In various computing environments, a routine may be used to enhance, correct, or polish the quality of segments served to downstream entities. A sample environment includes a transcoder and a segment frame polisher. The transcoder may be in accordance with transcoders described elsewhere in this disclosure and may be implemented using hardware, software, and a combination thereof. The transcoder may receive one or more multimedia input segments and transcode the segments. However, one or more of the segments may be subject to a transcoding error such as a frame error that causes the segment quality metric such as a segment quality score to drop.

When a transcoded segment has a segment quality metric that indicates the quality of the segment is below a threshold, a segment polishing routine may be utilized to improve the quality of the segment. The segment polishing routine may utilize image processing techniques to improve the quality metric for a segment. The routine may be invoked either synchronously or asynchronously. A synchronous segment polishing routine may be executed as part of the transcoding workflow. When a segment is transcoded and a quality metric is encoded, the transcoder or a downstream component (e.g., a multimedia delivery platform) may determine that a segment should be enhanced, synchronously invoke the segment polishing routine, obtain an enhanced segment from the segment polisher, and continue performing additional steps (e.g., transmitting the enhanced segment from the transcoder to a CDN). An asynchronous segment polishing routine may also be executed as part of the transcoding workflow. A service separate from the transcoder may monitor the quality metrics of segments generated by the transcoder and invoke a workflow to run the segment polisher upon detecting that a generated segment has a quality metric that indicates the quality of a segment is below a specified threshold (e.g., a segment quality score is below a threshold value). As part of the workflow, a new thread on a computing device may be generated, a virtual machine instance may be generated, etc. In general, various other types of computing environments that are acceptable for executing an algorithm can be initialized to run the segment enhancement algorithms.

In some embodiments, a low-quality segment is generated by a transcoder and an event-driven platform detects that the segment has a quality metric indicating the quality of the segment is below a predetermined threshold. The quality metric falling below the threshold may be a condition that triggers the event-driven platform to asynchronously invoke a segment polishing routine that runs separately from the transcoder. In some embodiments, the event-driven platform may select the segment polishing routine from among multiple segment polishing routines that perform different techniques suitable for different contexts. The event-driven platform may inspect metadata in the segment that indicates that the segment was subject to an input packet error affecting some or all frames of the segment and select an appropriate segment polishing routine for fixing frame errors. Continuing with the example, the segment polishing routine may receive the damaged frame and perform a segment polishing routine that generates an enhanced segment. The segment polishing routine may perform one or more techniques that improve the quality segment metric of the damaged segment. For one or more damaged frames, the segment polishing routine may perform various suitable signal processing techniques such as calculating optical flow fields and interpolating synthetic frames by estimating motions. Some signal processing algorithms may utilize frames from segments adjacent to the damaged segment—therefore, a segment polishing routine may obtain the damaged segment as well as adjacent segments.

An event-driven platform may determine when an event occurs and perform custom logic in response to the event being triggered. An event trigger may, for example, be the detection of a segment having a quality metric below a threshold (e.g., a quality score below a threshold value) or the completion of a broadcast. The event-driven platform may be implemented using software, hardware, or some combination thereof. In some embodiments, distributed computing resources may provision and load custom logic/code in response to the event, run the code, and then unload the code and de-provision the computing resource. An event-driven platform may be implemented using an event-driven architecture, such as Amazon Web Service (AWS) Lambda. When a segment is transcoded, the event-driven platform may be notified (e.g., by the transcoder itself or a polling service that monitors the quality metrics of segments generated by one or more transcoders) that a multimedia segment has been created and the event-driven platform may then obtain the newly generated segment, determine whether conditions for triggering a segment polishing routine have been satisfied (e.g., inspecting segment and/or frame metadata), and specify custom code or logic that should be run in response to any conditions that are satisfied. In some embodiments, a backend system may have a task scheduler that may be used to schedule periodic tasks. In some embodiments, when a segment is transcoded, the transcoder may programmatically notify the event-driven platform that a new segment has been transcoded and the event-driven platform may receive the notification and schedule a task to be run to re-transcode the segment at a later time.

The event-driven platform may have access to a repository of custom logics. The repository may be any suitable storage system and may include hardware, software, and a combination thereof. The repository may include an association between trigger conditions to custom logics to be invoked upon satisfaction of the associated trigger. The repository may be implemented using a database, data structures, and any combination thereof. When an event is received by the event-driven platform, the event-driven platform may access the custom logics repository and obtain the custom logic corresponding to the event. After using the event to obtain custom logic associated with the event, the event-driven platform may invoke the custom code. The event may be triggered by the quality metric of a segment being below a threshold due to a frame error. The event-driven platform may receive the event and the segment, inspect the segment metadata to determine that the quality of the segment degraded due to a frame error and obtain a frame error mitigation custom logic using the repository.

The segment polishing routine may be invoked by the event-driven platform. In some embodiments, the segment polishing routine may be executed on a virtual machine instance of a distributed computing platform. The segment polishing routine may be in accordance with those described above. The segment polishing routine may receive the low-quality segment and perform one or more signal processing techniques to improve the quality of the segment.

For example, the segment polishing routine may obtain adjacent segments and use a collection of segments to perform various suitable signal processing techniques such as calculating optical flow fields and interpolating synthetic frames by estimating motions. A transcoder may be used to transcode an enhanced segment corresponding to the content of the low-quality segment.

The segment polishing routine may be invoked in response to an event-driven platform detecting that the segment quality metric of a segment is below a threshold metric. In some cases, additional segments such as temporally adjacent segments may also be provided to the segment polishing routine. The segment polishing routine may perform signal processing techniques and provide the enhanced segment to a multimedia delivery platform. The multimedia delivery platform may be configured to dynamically inject the enhanced segment to the broadcast stream. For example, the multimedia delivery platform may receive a set of segments from a transcoder and prior to transmitting one of the segments, the multimedia delivery platform also receives a corresponding enhanced segment from a segment polisher. The multimedia delivery platform may be configured to replace the low-quality segment with the corresponding enhanced segment that has a quality metric indicating the segment has a higher quality. The enhanced segments may be provided, along with other segments received by the transcoder, to a downstream entity such as a content delivery network or a multimedia playback device.

Various environments may be suitable for monitoring the quality of multimedia segments that are generated. In some embodiments, a data center may be used to stream multiple broadcasts simultaneously using multiple transcoders in a distributed manner. In such a system, it may be desirable to implement a quality control service that may be used to detect and root cause issues that can cause degradation of services such as transcoding services.

A data center may be configured to receive requests from multiple requestors to perform various computing-related services. The multimedia input streams may be redundant streams of the same underlying multimedia content or may be unrelated content. The data center may be configured to provide transcoding services.

Quality control information that is logged may include various types of data. In general, quality control information includes information regarding a segment that is transcoded and granular information regarding the computing environment in which the segment was transcoded. A logging entry may include a reference to a segment that is transcoded, the sequence of the segment, information about the transcoding input format and/or the transcoding output format, the segment quality metric, indications of errors and the types of errors, and any combination thereof. The logging entry may also include granular information about the computing environment in connection with the transcoding operation. In some cases, more verbose logging may be available, and may additionally include memory dumps and telemetry data that may be useful in the context of diagnosing unexpected programmatic behavior. Additional metrics relating to the transcoding operation may be included in the quality control information as well, such as the time the transcoding operation occurred, how long the transcoding operation took to run, and more.

The quality control information may be stored in a logging system as a logging entry. A quality control service may monitor and evaluate quality control information entries that are logged. In some embodiments, the quality control service may operate as a backend service component that periodically polls the contents of the logging system, detects abnormal states that may cause low-quality multimedia segments to be generated, and to perform additional analysis on data sets available through the logging system. In some embodiments, the quality control service may utilize an event-driven platform. For example, an event-driven platform may be used to implement a periodic polling schedule to run the quality control service at regular intervals by using a time-based event to trigger a custom logic that invokes the quality control service. An event-driven platform can also be used to cause the quality segment service to be invoked based on event triggers such as detection of quality segment metrics falling below a certain threshold on a computing device, based on a run of several segments progressively having lower and worse quality metrics, and more.

The quality control service may be configured to perform processes for detecting and diagnosing abnormal quality metrics. The quality control service may inspect quality metrics such as the quality control information stored in the logging system and may use an aggregate view of the collected metrics to determine whether the abnormal quality metric detected indicates a problem that is actionable to a system administrator. As a first example, a transcoder running on a first server may generate a first multimedia output stream having a consistent but low quality metric regardless of the multimedia input. The low segment metrics may trigger an asynchronous segment polisher workflow to enhance the segments as discussed above, but may also trigger an event-driven platform to run the quality control service to perform an audit of quality control information that was recorded to diagnose what caused the low-quality frame. An event trigger for running the quality control service may be a series of multimedia segments being generated with a low quality metric.

The quality control service may access the logging system and retrieve a collection of quality control information entries for segments that were transcoded before and/or after. By inspecting the quality control information for other segments transcoded by the same machine around the same time, the quality control service may make a determination that a series of low quality metrics indicates that the computing environment may have an issue—the server may have degraded performance due to various factors such as malware running on the system, a memory leak that causes less RAM to be available to the system than otherwise would be expected, orphaned threads, and software bugs that may be difficult to reproduce except under very specific circumstances. The quality control service may send a notification to an administrator.

As a second example, a transcoder running on a second server may generate a second multimedia output stream having progressively decreasing quality metrics. The quality control service may be invoked by an event-driven platform in response to detecting a segment having a low quality metric or a series of low-quality segments. In this case, the quality control service may determine, based on quality control information of prior and/or later segments transcoded by the server that the quality of segments generated by the server is degrading over time. The root cause issue may be a memory leak that is gradually consuming more and more memory over time or may be related to an expected degradation of computer hardware performance over time. In some cases, the quality control service may evaluate whether the degradation is in line with expected degradation based on the operating lifespan of the server (which may also account for the level of intensity that the server was used) and determine that the server should be de-prioritized or retired. As a third example, a third transcoder running on a third server may generate a third multimedia output stream in which there are intermittent failures that cause transcoding errors. A quality control service may evaluate previous transcoding errors, determine that the errors are all related—for example, a transcoder may output the same error code for each—and notify a system administrator or diagnosis expert of the error code. Additionally, the internal state of the transcoding operation may be preserved, such as the input multimedia that caused the error, a memory dump, a snapshot of the computing resource that performed the transcoding operation (e.g., a virtual machine instance), and more.

As a fourth example, quality control information from transcoders in multiple regions may be stored in a logging system. Transcoders from multiple regions may each encounter a transcoding error when transcoding a particular segment of multimedia. In response to detecting transcoding errors, an event-driven platform may invoke a quality control service to perform analyses on what may have triggered the error. The quality control service may detect that the same transcoding error was generated by multiple transcoders of multiple servers attempting to transcoding same underlying content. Thus, the quality control center may determine that the error was related to the multimedia input and may generate a notification that is dispatched to a console so as to alert a visual quality expert, system administrator, media developer, etc., as to the error. In some cases, the multimedia input received by both input may have been damaged; in other cases, a transcoding algorithm may have a bug that only manifests with certain multimedia inputs; and more. Thus, it may be desirable to implement a quality control service that may be used to detect and root cause issues that can cause degradation of services such as transcoding services.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment in which various embodiments can be implemented. The computing environment 100 illustrates a source 102 that may be a multimedia source; a primary transcoder 104; a secondary transcoder 106; a multimedia delivery platform 108; a multimedia playback device 110; and a viewer 112. In some embodiments, multimedia content such as video, audio, data, or a combination thereof, is capture at the source 102 and made available for viewing to a viewer 112 via a multimedia playback device 110. The multimedia content can be distributed to multiple viewers across multiple locales, and can be served in real-time (e.g., live streaming) as well as on-demand (e.g., played back at a later point in time upon request).

The source 102 may be a multimedia source such as video, audio, data, or a combination thereof. The source can be multimedia of a fixed duration or open-ended (e.g., a live broadcast which may last for an unspecified period of time). For example, the source 102 may be a feed directly from a camcorder or other recording device that is connected to a network which is used to transmit the feed to one or more encoders. The source 102 may have analog and/or digital components and may include a combination of both in some cases. Examples of sources in accordance with various embodiments include: a multimedia stream that is provided in real-time (e.g., from a broadcaster); an analog multimedia recording (e.g., a video home system (VHS) recording); a digital multimedia recording (e.g., a MPEG-4 file); and more. In some embodiments, the source may provide multimedia content as a single, contiguous block of data (e.g., an entire MPEG-4 file provided to a transcoder) or may be provided as one or more discrete blocks (e.g., real-time stream continuously buffers 2-seconds of broadcasting and provides the stream in 2-second segments to a transcoder).

A source 102 may be transmitted over a network to one or more transcoders and/or encoders such as the transcoders 104 and 106 shown in FIG. 1. In general, multimedia of analog formats may be provided to encoders whereas multimedia of digital formats may be provided to transcoders. A transcoder such as the transcoders 104 and 106 shown in FIG. 1 may be used to transcode digital media received in one encoding format into digital media of a second encoding format, for example, in a format that is suitable for use by a multimedia delivery platform 108. As part of transcoding multimedia content received from a source, the transcoder may: re-encode an input media source from one compressed format to another; re-encode the media from one bitrate to another; resize the video from one resolution to another; change the aspect ratio of video; compress the media using a compression algorithm; change the framerate of the video; embed captions; audio processing such as loudness controls; generate overlays of graphics; and any combination thereof. This list is merely illustrative and transcoders may be configured to perform additional options to those examples just described. Transcoders and encoders may be used to implement additional functionality. In some embodiments, multimedia content may be duplicated to two or more source streams and a first source stream may provide a first multimedia content input to a first transcoder/encoder and a second source stream may provide a second multimedia content input to a second transcoder/encoder.

A transcoder may receive multimedia content input, transcode the multimedia content input, and generate an output. FIG. 1 shows an embodiment where a source 102 provides multimedia content 114A to the primary transcoder 104. The transcoder may perform various multimedia-related operations such as re-scaling the media, segmenting the video (e.g., splitting the input media content 114A into two or more segments), re-encode the media to a format that is suitable for use by a downstream provider such as a multimedia delivery platform 108, and so on. Segmenting the input may involve splitting the input media content 114A into multiple segments. For example, a 30-second audiovisual input is split up into fifteen segments such that each segment shows a consecutive 2-second segment of the input such that the segments can be reassembled (e.g., by a media playback device) to show the entire 30 seconds of content. For example, FIG. 1 illustrates the primary transcoder 104 receiving an input media content 114A and transcoding the input into three segments 116A, 118A, and 120A that can be reassembled to form the input content. Likewise, FIG. 1 further illustrates the secondary transcoder 106 receiving a media input 114B (corresponding to the same source content as media content 114A) and transcoding the input into three segments 116B, 118B, and 120B. The respective segments may correspond to the same underlying content. For example, the media inputs 114A and 114B may be the same underlying 30-second media clip, and the transcoded output segments may correspond to 10-second segments of the input media clip. 116A and 116B may correspond to the first 10-seconds of the clip; 118A and 118B may correspond to the middle 10-seconds of the clip; and 120A and 120B may correspond to the last 10-seconds of the clip.

A segment may include audiovisual media. A segment may include: one or more visual frames that, when assembled together, may form a video; audio sound for the segment; and a manifest. The manifest may include metadata that is used by a playback device to determine how to render the audiovisual information. The manifest may include information such as the frame rate, codec, sequence information, bitrate, etc., of the media included in the segment. A transcoder may assign a segment a quality metric based on one or more factors that potentially impact the quality of the transcoded output. These factors may include whether an input packet error was detected; whether a decoding error was detected; whether there was insufficient or unsatisfactory computing resources available; whether a frame error was detected; and more. The segment quality metric may be thought of, generally, as the overall quality of a segment and attest to a quantitative measure of how well the transcoded output reproduced the media content provided by the source 102. A segment quality metric may include one or more numeric values indicating the quality of various aspects of a multimedia segment. Additionally, frames of a segment and/or audio data of a segment may include additional metadata such as quality metrics for individual frames and/or audio components. A quality metric may be a single numeric value that encapsulates a holistic evaluation of the segment as a whole, but may also include more detailed information, such as metadata regarding how a quality metric may have been negatively affected. For example, metadata for a segment indicates that there was an input packet error that caused one or more frames of the segment to not be received by the transcoder. The individual frames may further indicate where the input packet error occurred—for example, a frame with no audiovisual data or placeholder data (e.g., a default slate) may have metadata indicating an input packet error. A media segment in accordance with those described in connection with FIG. 1 is discussed in greater detail below in connection with FIG. 2.

While two transcoders 104 and 106 are shown in FIG. 1, multimedia from a source 102 may be transmitted to three, four, or even more transcoders in the same or similar manner as described in connection with the primary and secondary transcoders. Furthermore, encoders may be used to encode analog multimedia and may, generally, be used to encode analog media to a format that may be acceptable to be received and processed by a multimedia delivery platform 108. In some embodiments, the transcoders may be output locked. In some embodiments, the transcoders may generate video segments that are synchronized to each other such that a first segment generated by a first transcoder includes a certain set of frames from an input source and another transcoder generates a corresponding segment having the same set of frames as the first segment generated by the first transcoder.

A multimedia delivery platform 108 may receive multimedia from one or more transcoders and perform various operations using the received multimedia. As an example, a multimedia delivery platform 108 may receive multiple copies of a multimedia segment from various transcoders and/or encoders in various formats. For the example, a multimedia delivery platform 108 may receive five different resolutions of video (e.g., 240p; 360p; 576p; 720p; and 1080p) and two different audio formats (AAC stereo and 5.1 Surround Sound). Continuing with the example, the multimedia delivery platform 108 may select the most appropriate video and audio formats to provide to a particular playback device. In the example, the multimedia delivery platform 108 may provide a smartphone video that is at most 720p resolution if the viewer cannot tell the difference between 720p and 1080p video on the smaller-sized smartphone display. In this way, the multimedia delivery platform 108 may provide a viewer of the multimedia content the best available quality on a smartphone while at the same time reducing bandwidth costs and initial video starting delay due to buffering 720p video rather than 1080p video. Likewise, for devices that only support stereo audio, the multimedia delivery platform 108 may serve only AAC stereo audio format and not 5.1 Surround Sound audio for similar reasoning as above in connection with the selection of appropriate video formats. The multimedia delivery platform 108 may be configured to provide additional functionality, such as inserting advertisements into the multimedia content.

The multimedia delivery platform 108 may receive multiple streams with the same encoding. For example, both the primary transcoder 104 and the secondary transcoder 106 may provide multimedia segments of the same resolution, audio quality, etc., to the multimedia delivery platform 108. In an embodiment, these streams are redundant—in other words, the primary transcoder 104 and the secondary transcoder 106 encode media in the same encoding format. Continuing with the embodiment, the multimedia delivery platform 108 receives two or more redundant streams (e.g., a third transcoder may also encode the media in the same encoding format and provide it to the multimedia delivery platform 108) and selects, among two or more redundant segments, the segment with the best quality metric and delivers that segment. The other redundant segments may be discarded.

For example, a first portion of multimedia content may be transcoded in a particular encoding format by the primary transcoder 104 to produce three segments 116A, 118A, and 120A and the same portion of content may be transcoded by the secondary transcoder 106 to produce three segments 116B, 118B, and 120B. Segments 116A and 116B may correspond to the first 2-second block of the media, segments 118A and 118B may correspond to the second 2-second block of the media, and so on. The multimedia delivery platform 108 may receive the segments 116A and 116B and select the segment corresponding to the first 2-second block of media with the higher quality metric. In this example, the segment 116A from the primary transcoder 104 may be selected because it has a higher quality metric than the segment 116B from the secondary transcoder 106 (assuming that higher quality metrics are better). Regarding the second 2-second block of media, the segment 118B from the second transcoder 106 may be selected by the multimedia delivery platform 108 because it has a higher quality metric. Various local environmental factors may contribute to quality metrics, such as the availability of computing resources for a transcoder, network latency, and more. The segments selected with the highest metrics may be provided to a viewer's multimedia playback device 110. In FIG. 1, the best quality segments 116A, 118B, and 120A may be provided (first segment: 100>85; second segment: 85<95; and third segment: 100>95). Various types of behavior may be acceptable where two or more segments are tied for the best quality metric, and even nondeterministic behavior is acceptable so long as the selected segment is selected from the two or more segments tied for the best quality metric. In some embodiments, the multimedia delivery platform 108 does not directly provide the selected segments to the multimedia playback device 110, but rather, the multimedia delivery platform 108 provides the selected segments to a content delivery network (not shown in FIG. 1). A content delivery network (CDN) may refer to a network that delivers content to users with high availability and high performance. One or more CDNs may then provide content to multimedia playback devices 110. In some embodiments, the segments that the multimedia delivery platform 108 provides (e.g., to a CDN) may include the quality metrics embedded in the segments and/or frames of the segments, but in other embodiments, some or all of the segment metric metadata may be stripped out by the multimedia delivery platform 108 prior to providing the segments to downstream entities such as CDNs. In some embodiments, a content delivery network receives segments of a multimedia stream and caches the segments (e.g., in a data structure or structured storage). Segments of the CDN cache may have a time-to-live (TTL) parameter that specifies how long a cached segment is cached. The TTL for a segment may vary based on the segment's quality metric—for example, segments with worse quality metrics may be cached for shorter durations (i.e., segment with worse quality metrics may have shorter TTL values). Additionally, cached segments may be replaced, such as in the case where a better version of a segment becomes available (e.g., via a segment polishing routine as described below in connection with FIGS. 7-12).

A multimedia playback device 110 may be a device that requests and/or receives multimedia content. The multimedia playback device 110 may be a smartphone, tablet computing device, personal computer, laptop, set-top box, smart television, and the like. A viewer 112 may use the multimedia playback device 110 to view multimedia either directly (e.g., in the case of a smartphone which has a built-in display) or indirectly (e.g., in the case of a set-top box connected to a television). A viewer 112 that receives multimedia served in accordance with techniques described herein may be more satisfied with the quality of the multimedia content he or she is presented with.

Figure 2:
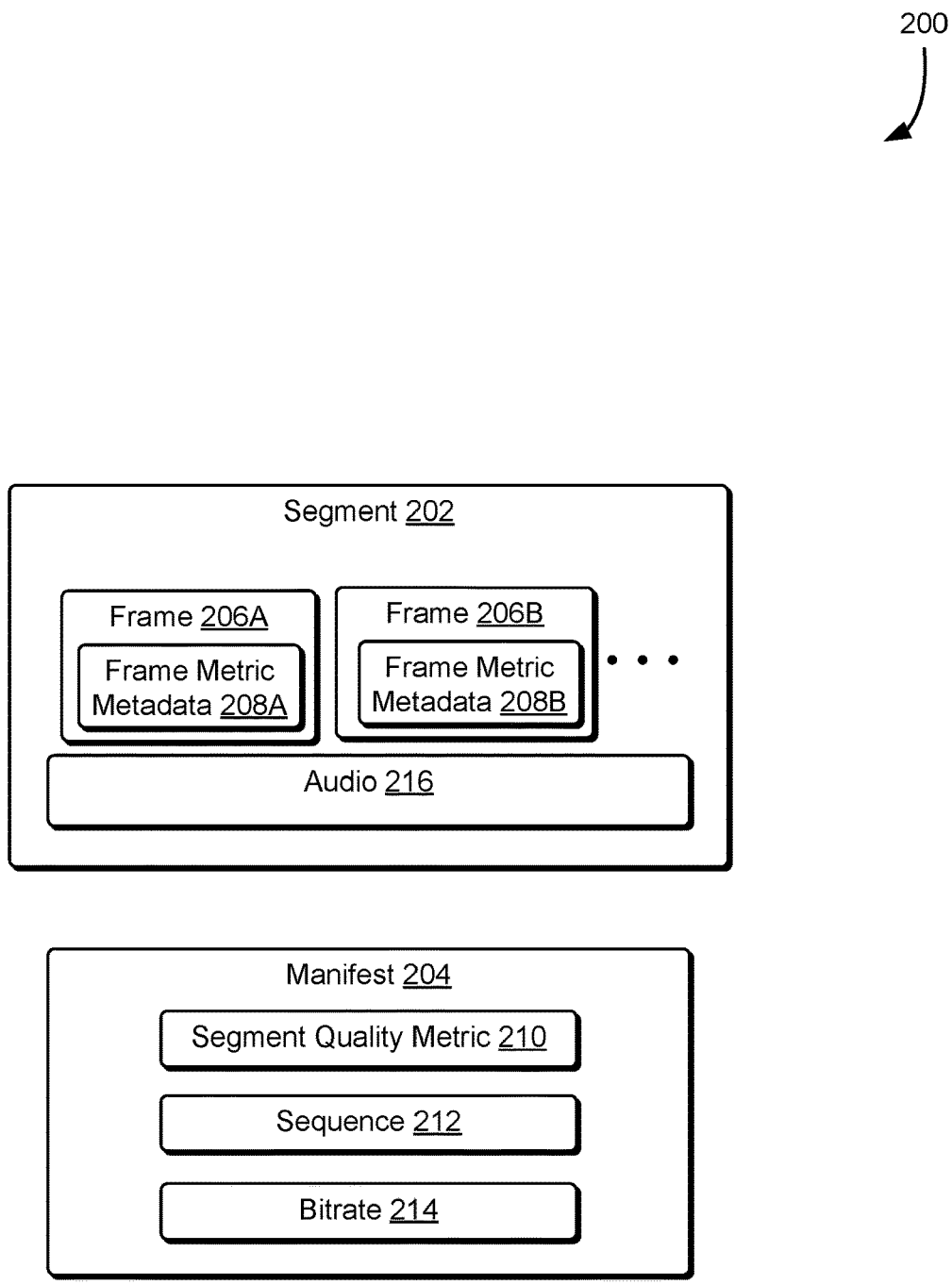
FIG. 2 illustrates an example of a multimedia segment.

FIG. 2 illustrates a diagram 200 of a multimedia segment 202 in accordance with various embodiments described throughout this disclosure. A multimedia segment 202 may have a corresponding manifest 204. The multimedia segment 202 and/or manifest 204 may be implemented in accordance with various standards such as the HTTP Live Streaming (HLS) protocol, Dynamic Adaptive Streaming over HTTP (DASH), HTTP Dynamic Streaming (HDS) protocol, Smooth Streaming protocol, and the like.

A segment 202 may include video and/or audio information for at least part of a multimedia source content. A segment may include one or more frames such as frames 206A, 206B, etc., which when combined forms video content. The video may be playable at a certain frame rate (e.g., 24 frames per second), which may be specified in the corresponding manifest 204. In some embodiments, each frame covers a fixed duration of audiovisual content. For example, each segment of a particular stream may cover 2-seconds of content, which, if played at 24 frames per second, would include 48 frames of video content. In some embodiments, a frame includes frame metric metadata 208A and 208B. Frame metric metadata may include information that indicates the quality of the frame. A numeric value may be attached to the frame metric as well as information that indicates an error in the frame. For example, an error that occurred while transcoding a particular frame is encoded as metadata in that frame, which is used during a polishing routine to improve the quality of the frame, perhaps by re-encoding the segment from the source. Additional types of errors that may be indicated in the frame metric metadata may include input packet errors, decoding errors, and insufficient computing cycles. Audio 216 data may also be included as part of a segment and may be compressed audio, such as MP3 audio. In some embodiments, the segment quality metric is calculated based at least in part on the audio segments and/or audio frames.

A manifest 204 may be associated with a multimedia segment 202. In some embodiments, the manifest may be a file that is in accordance with various standards and protocols. For example, a manifest 204 is in accordance with the M3U8 manifest format specified for HLS. A manifest 204 may include metadata associated with the multimedia segment 202 such as a segment quality metric 210; a sequence 212; and a bitrate 214. The sequence 212 may refer to the temporal sequence in which the segment is played relative to other sequences. For example, if a sequence is a numerical value with value zero, that indicates the particular segment is the first segment and that the next segment that should be downloaded and played is the segment having a sequence value of one, and then the segment having a sequence value of two, and so on. The bitrate 214 may be used to determine which, among various streams, to select based on the available bandwidth to a playback device. A playback device may estimate its bandwidth and select the highest bandwidth that the bandwidth can accommodate. The segment quality metric 210 may be a holistic evaluation of the video and/or audio output quality of a segment. For example, the segment quality metric may be calculated based at least in part on the quality metric of the frame metrics shown in FIG. 2 as well as an audio quality metric associated with the audio 216 (not shown in FIG. 2). An audio quality metric may be determined based on various types of audio errors such as whether the audio volume exceeds a threshold level, detection of white noise, and the like.

The segment quality metric 210 may include a segment quality score that is a numeric value that encapsulates a holistic evaluation that metrics the quality of a multimedia segment. For example, a segment transcoded without errors is assigned a segment quality score of 100, whereas if a segment encounters an error (e.g., an encoding error, lack of computing resources) the quality score may be lower. When a segment is transcoded by a transcoder, the transcoder may track the number and type of errors encountered during the transcoding of the frames of the segment and assign a score to the segment based on the severity of the errors. For example, a segment which encountered an error that resulted in a frame not being rendered has a lower quality score than a corresponding segment in which an error caused a pixel of the frame to not be rendered. In some embodiments, the segment quality metric 210 is a segment quality score which is calculated based on frame score metadata of some or all of the frames in the segment.

In some embodiments, the segment quality metric may be encoded in a manifest that is associated with a multimedia segment, such as in the manner described above in connection with FIG. 2. The segment quality metric associated with a segment may also be encoded in other ways. For example, the segment quality metric may be encoded in-band with the multimedia segment (e.g., embedded directly in the segment as metadata). As yet another example, the segment quality metric may be encoded out-of-band by storing a mapping between an identifier associated with a segment and the segment's segment quality metric in a database. Systems that obtain a segment may determine the identifier associated with the segment, provide the identifier to a database or a database management system as part of a request, and receive the corresponding segment quality metric as a response to the request.

Figure 3:
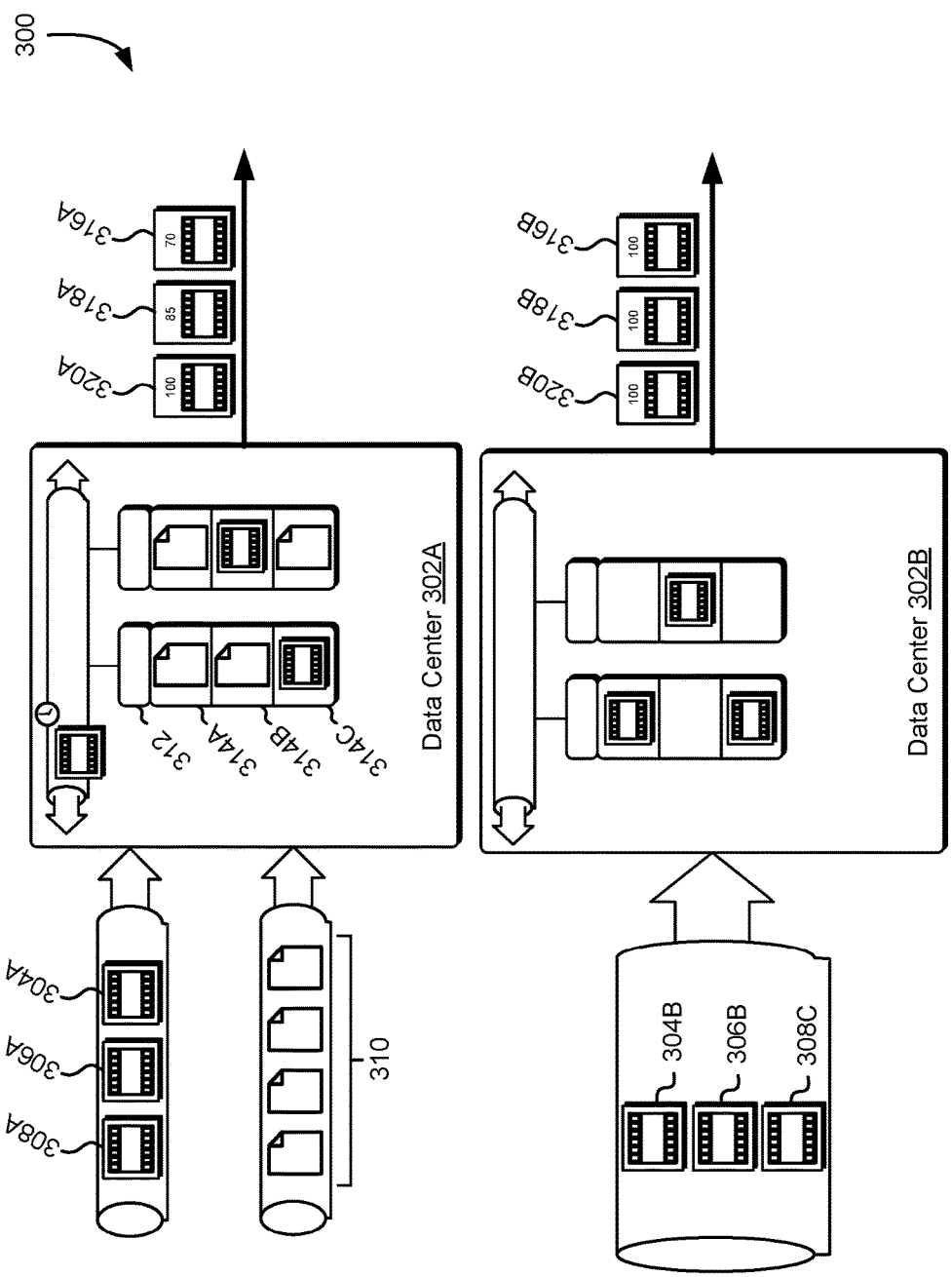
FIG. 3 illustrates an environment in which multiple data centers may be used to provide encoding/transcoding services.

FIG. 3 illustrates an environment 300 in which various embodiments in accordance with this disclosure may be practiced. The environment 300 illustrated shows a first data center 302A and a second data center 302B that may be utilized in conjunction with performing transcoding operations and generating quality metrics. The data centers shown in FIG. 3 may provide compute services. A compute service may include providing computing resources, storage resource, software packages, etc., in a service-oriented architecture. For example, resources of a data center may be used to implement a transcoder described elsewhere in connection with FIG. 1.

While various embodiments described in this disclosure describe quality metrics such as quality scores having a decreased value due to errors, there are cases in which a segment may have a lower quality score or worse quality metric even in the absence of a transcoding error. For example, in some cases, a transcoder may generate a segment having a lower bitrate (and lower quality score) due to temporary conditions in the computing environment that may cause the transcoder to make a tradeoff of quality for speed, such as where there is unexpectedly high network congestion or an unexpectedly high load in requests to a distributed computing environment that shares computing resources between the transcoder and other computing entities. While network congestion is not necessarily considered an error, segment quality metrics may be adversely affected by such conditions, even where there are no errors such as decoding errors, input data errors, and frame errors detected as part of the transcoding process. It should also be noted that although network congestion is not typically considered an error, adverse network conditions can, under certain circumstances, be considered a type of networking error, such as when there is an increase in the number and/or rate of dropped packets, latency beyond a certain threshold, etc.

Consider the data center 302A shown in FIG. 3. Servers of the data center 302A may be used to fulfill computationally intensive operations. Requests to perform operations may be sent to the data center 302A as requests such as application programming interface (API) requests. For example, a request may be made to transcode input multimedia segments 304A, 306A, and 308A. Additionally, the data center may also receive requests to perform other operations 310 unrelated to transcoding services. As requests are sent to the data center 302A, they may be routed to computing resources within the data center for fulfillment of the requests. FIG. 3 illustrates a data center 302A with several servers 314A, 314B, and 316C which may be used to fulfill the requests. The servers may be organized so that several servers are connected to a top-of-rack switch 312 which in turn links the servers of the rack to the rest of the data center. In such a configuration, traffic to/from the servers 314A, 314B, and 316C pass through the top-of-rack switch 312. The top-of-rack switch 312 may be connected to other top-of-rack switches using high-bandwidth, high-throughput fiber. The data centers 302A and 302B may be in different geolocations and may be subject to different external factors that may affect the quality metrics of segments generated in one data center compared to another.

In an embodiment, a multimedia input 304A, 306A, and 308A, may be provided from a source input to a first data center 302A to be transcoded such as in the manner described elsewhere in connection with FIG. 1. A data center may receive the request and distribute the input segments to various computing resources that are available to perform the transcoding operations requested. However, the data center 302A may be servicing other requests 310 from other clients. As a result, the data center 302A may quickly run out of computing resources. In FIG. 3, an example is shown where server 314A is fulfilling a non-transcoding request, server 314B is also fulfilling a non-transcoding request, and server 316C is fulfilling a transcoding related request for one of the input segments. As the computing resources of the data center 302A are committed, the data center 302A may reach its capacity and may queue or delay 322 the fulfillment of one of the transcoding requests. In some embodiments, there are requirements as to how long the transcoding operation may take such that viewers will not be adversely affected—for example, taking too long to transcode a segment may result in latency, buffer, or other undesirable behavior. As a result, a segment that is delayed 322 may have a worse quality metric when transcoded, due to less computational resources being able to be used. Thus, in the example illustrated, if the first input segment 304A arrives at the data center and is transcoded prior to the other requests 310 being serviced, the quality of that corresponding output segment 316A may be high (as denoted by the segment quality metric of "100"), but as the other requests 310 flood into the data center and commit resources to unrelated tasks, the amount of computing resources available may diminish and the quality metric of subsequent output segments 318A and 320A may diminish as the transcoding of the subsequent segments 306A and 308A may be competing for computing resources with the unrelated requests 310.

However, other data centers may not be affected. For example, a second data center 302B may receive the input segments 304B, 306B, and 308B over a second network path which may be a high-bandwidth, high-throughput channel (e.g., using fiber). The data center 302B may receive other requests at a lower rate, and therefore have more computing resources available to perform the transcoding operations. In this way, the output segments 316B, 318B, and 320B, may have high segment quality metrics because they were not subject to the errors and degradation factors that the first data center 302A was subject to.

Furthermore, it should be noted that some external factors may affect the output quality of segments transcoded across multiple data centers in multiple geolocations. Take, for example, the case where a source input is transmitted to both data centers with packet loss (e.g., a first communication channel not shown in FIG. 3 suffered packet loss and was used to route the segments to both data centers). In such an example, the packet loss would affect the segment quality metrics of output segments from both data centers as some frames would not have even been received by the data centers for transcoding.

Figure 4:
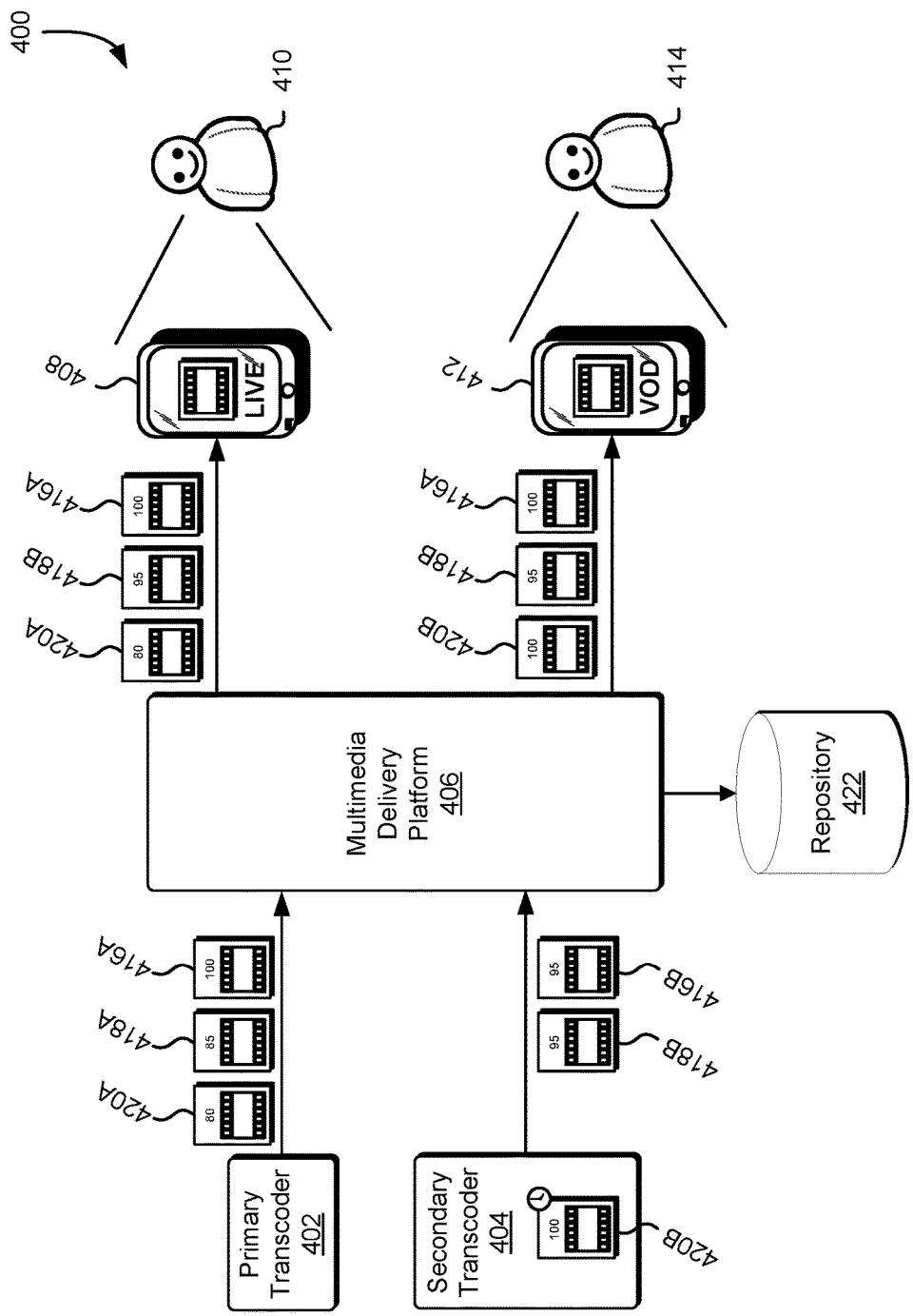
FIG. 4 illustrates an environment in which multimedia is delivered to multiple viewers in both live and on-demand settings.

FIG. 4 illustrates an environment 400 where a multimedia delivery platform 406 may improve the quality of an on-demand video segment over the quality of the live segment. The environment 400 includes a primary transcoder 402, a secondary transcoder 404, a multimedia delivery platform 406, a first multimedia playback device 408 that is used to stream media in real-time, a second multimedia playback device 412 that is used to stream the same media at a later point in time (i.e., on-demand), and a multimedia repository 422. As discussed elsewhere in connection with FIGS. 1 and 3, there are constraints in the amount of time that may be spent on transcoding media segments when streaming in real-time.

Generally speaking, slightly degrading the quality of a segment and providing it within real-time performance constraints is preferable to a delay in serving the segment which results in buffering or delaying the multimedia stream. Therefore, in many cases, a transcoder may use a lower quality transcoding algorithm that is faster if it determines that there is not enough time to use a higher quality algorithm to meet real-time performance constraints. As an example, the primary transcoder 402 may suffer from some of the degradation factors discussed elsewhere in connection with FIG. 3, resulting in a decrease in segment quality metrics from the first segment 416A transcoded to the second segment 418A transcoded to the third segment transcoded 420A.

The primary transcoder 402 may be a transcoder such as those described elsewhere in connection with FIGS. 1-3. The primary transcoder 402 may be hardware, software, or a combination thereof. For example, the transcoding may be performed on a virtual machine instance of a compute service provider (e.g., a provider of computer-related services such as computing resources (e.g., CPU resources); storage resources; and more). In some examples, the primary encoder 402 receives a stream of multimedia input in real-time and has an upper-bound to the amount of time that it can use to transcode segments so that a real-time stream is not delayed. The primary transcoder may generate output segments 416A, 418A, and 420A based on multimedia input received (not shown in FIG. 4). The same input may be provided to the secondary transcoder 404. The output segments 416A, 418A, and 420A may be provided to a multimedia delivery platform 406.

The secondary transcoder 404 may be implemented in the same or similar manner as described above in connection with the primary transcoder 402 and elsewhere in connection with FIGS. 1-3. The secondary transcoder may receive a multimedia input stream and generate output segments. The secondary transcoder 404 may generate a first output segment 416B under real-time performance constraints, generate a second output segment 418B under real-time performance constraints, but may be delayed in generating the third output segment 420B such that the third output segment 420B is not delivered to the multimedia delivery platform 406 within real-time performance constraints. The delay can occur due to various factors. For example, when a transcoder such as the secondary transcoder 404 receives a multimedia input, the transcoder may estimate the amount of time various transcoding algorithms may take to transcode a particular segment and select an algorithm whose estimated transcoding time fits within a particular threshold. However, the transcoding operation may take longer than expected due to the particular set of frames that are encoding being particularly complex to transcode. Other factors may include an unexpected latency in transmission of the segment 420B to the multimedia delivery platform 406, packet loss, and more.

The multimedia delivery platform 406 may be implemented using techniques described elsewhere regarding multimedia delivery platforms such as those described in connection with FIGS. 1-3. A multimedia delivery platform 406 may be configured to receive two or more redundant segments (e.g., multiple segments 416A and 416B encoded in the same resolution, aspect ratio, bitrate, etc., and encoding the same underlying media content), inspect the quality metric of the two or more redundant segments, select the segment with the best quality metric, and provide the selected segment to a downstream entity such as a CDN or a multimedia playback device requesting the media. The multimedia delivery platform 406 may be configured to wait for a determined amount of time for the redundant segments to arrive before performing the selection of a segment with the best quality metric. The amount of time that the multimedia delivery platform 406 waits may be determined at least in part based on network traffic conditions and may be based on latency, bandwidth, and other factors that may affect how long it is expected for the segment to be received by the downstream entity (e.g., a CDN) after a segment is selected and transmitted by the multimedia delivery platform 406.

The multimedia delivery platform 406 may be configured so that it will select a redundant segment with the best quality metric even if some transcoders have not finished transcoding the same segment. As an example, consider a case where a viewer 410 uses a multimedia playback device 408 to tune in to a live broadcast such as a sporting event (e.g., Super Bowl) or a special event (e.g., New Year's Eve Ball Drop). The viewer's enjoyment of the broadcast may be negatively impacted by the stream being delayed and/or buffered due to the temporal immediacy of the broadcast—for example, a delay in a stream of a New Year's Eve Ball Drop, even for a short duration, may be undesirable. Therefore, a multimedia delivery platform 406 may select the third output segment 420A provided by the primary transcoder 402 if a threshold amount of time has passed and the secondary transcoder 404 has not yet provided a corresponding third segment 420B, for example, due to particularly high commitment of computing resources that prevents the secondary transcoder 404 to transcode the segment within the allotted time to accommodate for real-time streaming constraints.

In some embodiments, the segments that are selected by the multimedia delivery platform 406 may be stored in a multimedia repository 422. The repository 422 may be a component of the multimedia delivery platform 406 therein or a separate component accessible to the multimedia delivery platform 406. In some embodiments, the repository 422 is a short-term storage repository of multimedia segments (e.g., an in-memory cache stored in RAM) or may be stored in a non-volatile storage medium such as a hard disk drive. The multimedia repository 422 can be implemented using software, hardware, or a combination thereof. For example, when a viewer 410 requests to view a live broadcast, the multimedia delivery platform 406 supplies the selected first multimedia segment 416A to the viewer's multimedia playback device 408 and also stores the segment 416A in the multimedia repository. Likewise, when the multimedia delivery platform 406 receives the second segment from both the primary transcoder 402 and secondary transcoder 404, the multimedia delivery platform 406 inspects the segment quality metric of the segment 418A supplied by the primary transcoder and the segment quality metric of the segment 418B supplied by the secondary transcoder and selects the segment with the better quality metric. When the selected segment 418B is transmitted to the playback device 408, it is also stored in the multimedia repository 422. As with the third segment, the multimedia delivery platform 408 may receive the third segment 420A from the primary transcoder 402 and, after not receiving the third segment from any other sources within a predetermined threshold time, select the third segment 420A as the segment with the best quality metric. The third segment 420A will be provided to the viewer's playback device 408 and also stored in the repository 422.

Playback quality for multimedia may be improved using the multimedia delivery platform 406 even when segments are delayed and not received by the multimedia delivery platform 406 in compliance with real-time performance constraints. In some embodiments, a delayed segment such as the segment 420B shown in FIG. 4 is received by the multimedia delivery platform 406 after the multimedia delivery platform 406 has performed the selection of the segment to be transmitted (e.g., to a CDN)—in other words, segment 420A, which has a lower quality metric than segment 420B, may have already been transmitted to the playback device 408. In such a case, the quality of catch-up and on-demand media may be improved by accessing the media repository and replacing the transmitted and stored segment 420A with a higher quality segment 420B. Thus, when a viewer 414 at a later point in time requests to view to media, the multimedia playback device 412 may receive a higher quality third segment 420B as a result of the replacement discussed above. An on-demand video may be a video that is stored at a point in time and played at a point in time afterwards when requested. Catch-up media may refer to providing media for a broadcast that was paused (e.g., a live broadcast may have been paused by the viewer who wants the broadcast to be resumed at a later point in time). The improvements described herein to serve media segments apply either the same or substantially the same to both on-demand and catch-up playback.

Figure 5:
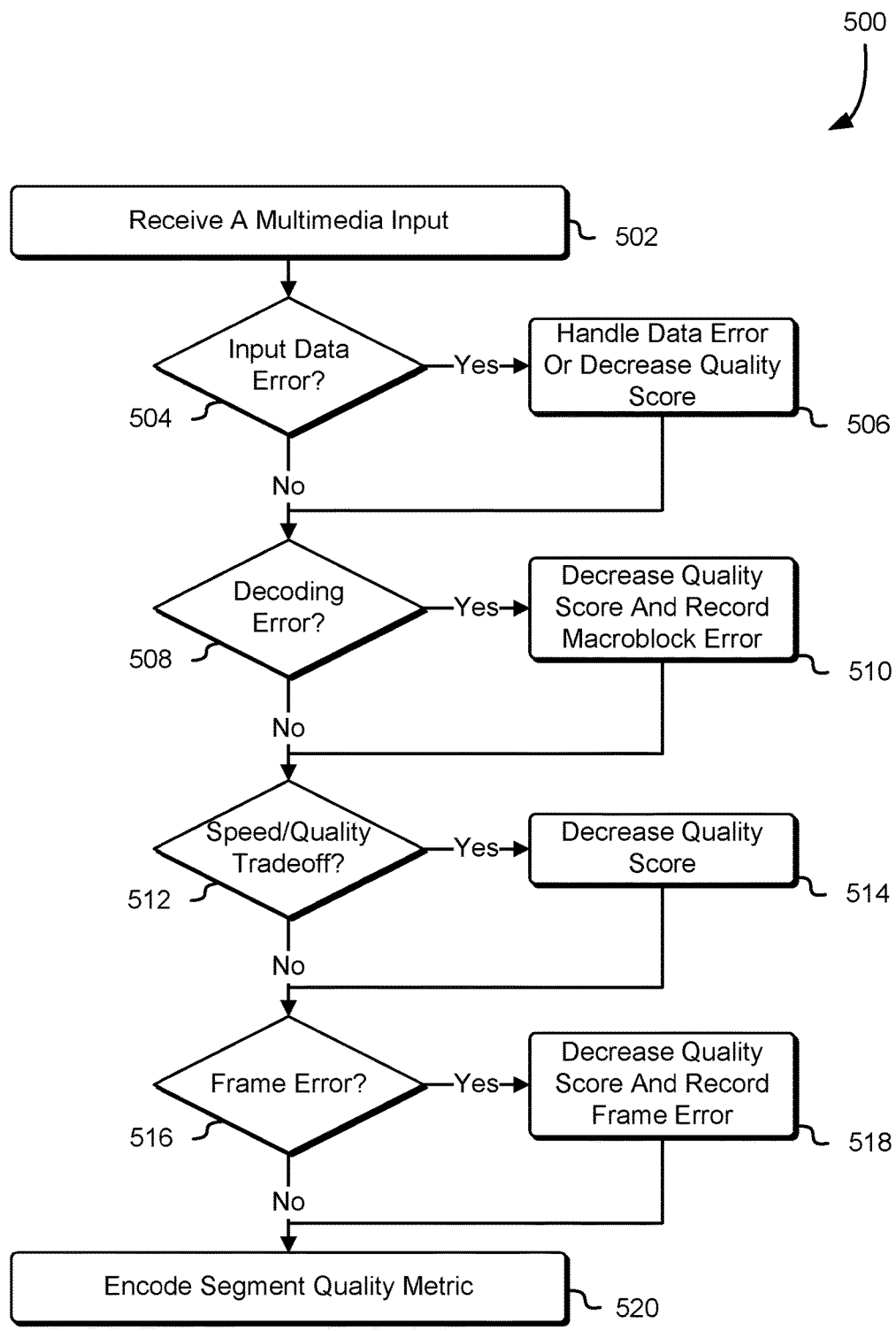
FIG. 5 illustrates a process for generating quality metrics.

FIG. 5 shows an illustrative example of a process 500 that may be used to encode metadata relating to the quality of a transcoded segment. Generally, the process 500 may be performed by any system that is operable to function as a transcoder, such as the transcoders described elsewhere in this disclosure. In an embodiment, the process 500 includes receiving 502 a multimedia input. The multimedia input may be the multimedia content received by the transcoders described above in connection with FIG. 1. In general, the multimedia input may be any media that can be transcoded from one media format to another. The system performing the process 500 may use hardware, software, or a combination thereof to perform the process. In some embodiments, the process may be performed in a distributed environment, such as on a virtual machine instance running on a server that is in a data center configured to fulfill requests from multiple requestors (e.g., clients of the data center or service provider).

It should be noted that the order in which the various error checks described in connection with the process 500 are merely illustrative and the order may differ in various implementations contemplated and may even occur in a nondeterministic order. The error checks may be performed in a multithreaded environment as well, such that the error checks are performed in parallel threads or processes. The error checks may even be performed in a distributed computing environment where a first computing instance (e.g., a first virtual machine) performs one check and another computing instance performs another check.

The system may check 504 whether an input data error occurred. An example of an input data error is an input packet error—a system that implements a transcoder may receive data packets that encode the input media as user datagram protocol (UDP) packets and the UDP packets may be lost due to the use of a lossy transmission medium. For transport streams, this can result in continuity errors; for real-time transport protocol (RTP) this is typically a sequence error. If an input data error was detected, the system may attempt to handle 506 the data error. Packet errors may be handled by performing error correction that allows for the error to be recovered from—for example, by using forward error correction (FEC) with RTP. In some cases, such as when FEC is utilized, errors can be detected and corrected. In cases where the errors are corrected, the segment and frame quality metrics are not to be decreased—however, the system may log metadata indicating which frames were corrected and/or how the correction was performed. The metadata may be encoded in the frame, the segment, or externally (e.g., a logging system may record how often a certain type of error was detected, which types of errors were corrected, etc., to provide insight regarding which among multiple error detection and correction algorithms is most effective). Conversely, if the input error cannot be corrected, the system may decrease the quality metric of the affected frames (e.g., the frames that were lost and not recovered); decrease the quality metric of the affected segments (e.g., the segments which the frames are a part of); generate placeholder frames (e.g., a blank slate may be generated in place of a frame which was lost as part of an input data error); and encode metadata (e.g., frame metadata indicating that a frame was lost and/or segment metadata indicating which frames of the segment were lost due to packet loss).

The system may check 508 whether a decoding error was detected. A decoding error may occur where no packets were dropped but the incoming data is malformed (e.g., blocks of zeroes or other data that does not resemble media). This type of error may occur when data is being decoded and the decoder encounters an error. If an error is detected, then the system may record 510 the number of macroblocks and/or slices that were decoded in error for each frame or may drop one or more frames in their entirety. The segment and frame metadata quality metrics may be decreased and metadata may be logged, for example, using principles similar to those described above in connection with this process 500.

The system may determine 512 whether there was a degradation of segment quality due to a tradeoff between speed and quality. For example, network congestion may cause a transcoder may receive a multimedia input in a delayed manner and the transcoder may determine that, as a result of having less time available to transcode the input, that the transcoding process should be performed with greater speed, but sacrificing quality. A speed/quality tradeoff degradation may also arise as a result of a lack of CPU cycles, CPU starvation, and the like. Segment quality can degrade when the aggregate complexity of a channel goes beyond a predicted threshold or if there are performance issues with the computing environment performing the transcoding process (due to memory leak, malware, orphaned threads, bugs, etc.) In cases where a transcoding is performed under real-time performance constraints, the system may make a tradeoff in performing less computationally intensive transcoding algorithms to accommodate the real-time performance constraints. For example, deblocking, elimination of mosquito noise, etc. can be adjusted to accommodate for the real-time performance constraints. In most cases, the output produced is not optimal and may be improved with additional computational resources. If a degradation due to lack of computing resources is detected, the system may decrease 514 the quality metric of the segment and/or individual frames. Additionally, metadata associated to the reason that the quality metric was decreased may also be recorded using techniques described elsewhere in this disclosure.

The system may determine 516 a frame error occurred. Frame syncing capabilities may determine that a frame was dropped. Upon detecting a frame error has occurred, the system may decrease 518 the quality metric of the segment and/or frames, and perform additional operations. As a result of a frame error, the system can drop the frame, repeat a previous frame, put up a blank frame (e.g., a black frame), or display an "error" slate after a threshold number of frames are dropped. Additionally, techniques described below in connection with FIGS. 6-12 may also be used to mitigate a frame error. Additionally, metadata associated to the reason that the quality metric was decreased may also be recorded using techniques described elsewhere in this disclosure. After performing the error checks described above, the system may encode 520 the final segment metric that encapsulates an aggregate assessment of the quality of transcoded segment.

Figure 6:
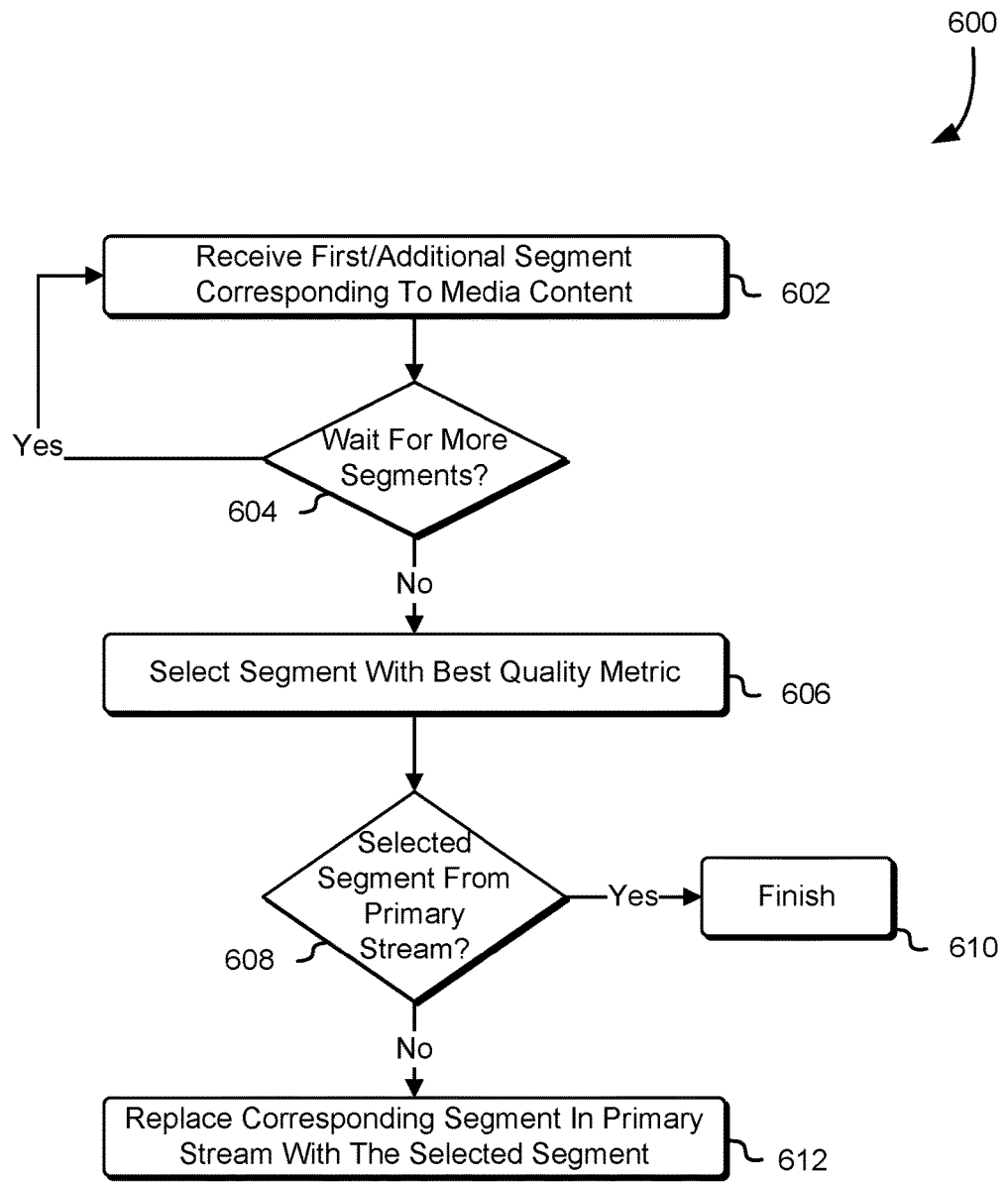
FIG. 6 illustrates a process for generating a multimedia stream.

FIG. 6 shows an illustrative example of a process 600 for using multiple multimedia streams to generate a high-quality stream. Generally, the process 600 may be performed by any system that is operable to function as a multimedia delivery platform, such as multimedia delivery platforms described elsewhere in this disclosure. In an embodiment, the process 600 includes receiving 602 a first segment corresponding to a particular piece of multimedia content. The received segment may be a multimedia segment generated by a transcoder and provided to a multimedia delivery platform such as in the manner described above in connection with FIG. 1. In general, the multimedia segment may be any media that can be transcoded from one media format to another. The system performing the process 600 may use hardware, software, or a combination thereof to perform the process. In some embodiments, the process may be performed in a distributed environment, such as on a virtual machine instance running on a server that is in a data center configured to fulfill requests from multiple requestors (e.g., clients of the data center or service provider).

The system may receive 602 a first multimedia segment corresponding to a particular multimedia content. The segment may include audio, visual, and a combination thereof. When a segment is received, the system may temporarily cache the segment for a predetermined duration to allow for additional segments to be received. The system may wait 604 for a predetermined period of time to allow for additional redundant segments to be received. In some cases, the redundant segments may arrive over a span of time from different transcoders, which may be due at least in part to multiple factors such as differences in: network latency; network bandwidth; network reliability (e.g., an unreliable network may drop more packets, resulting in the packets being retransmitted); availability of computing resources (e.g., such as in the case described above in connection with FIG. 3 where two transcoders are in different data centers); or transcoding algorithms (e.g., in some environments, different transcoding algorithms may be used to evaluate which algorithm performs better under certain conditions). The amount of time the system waits for more segments may be determined based on various conditions such as the expected amount of time it will take for the system (e.g., a multimedia delivery platform) to transmit the segment to the recipient entity (e.g., a CDN).

The system may further receive additional segments corresponding to the same media content. In some cases, when the system has completed waiting for more segments, the system may issue a message to one or more transcoders to provide the redundant segment. The system may do this in cases where the immediately preceding segment (e.g., the first two-seconds of a live broadcast) was received by that particular transcoder but the subsequent segment (e.g., the next two-second segment of the broadcast) was not received.

In some embodiments, the system will determine that it has completed waiting for more segments and select 606 a segment with the best quality metric. In some cases, the system caches each of the redundant segments (e.g., in a data structure such as a stack) whereas in other cases the system may selectively cache only the redundant segment with the best quality metric (e.g., by caching the first segment, and for subsequent segments, comparing the quality metric of the received segment with the cached segment and replacing the cached segment with the received segment if the received segment has a higher segment quality metric).

It should be noted that while the process 600 illustrated in FIG. 6 shows a system selecting a segment with the best quality metric, in some cases other selection processes may be used. In some embodiments, the system selects any segment that has a segment quality metric that exceeds a minimum value (e.g., the system selects the first segment that exceeds the minimum which is received within an allotted time interval). In some embodiments, the system may stop waiting for segments when it receives a segment that exceeds a minimum threshold. In this way, the system may ensure that the segments being served to downstream entities meet a minimum expected quality. In some embodiments, the system may complete waiting for more segments and walk a list of redundant segments (e.g., stored in a data structure such as a queue or vector) and select the first redundant segment that has a quality metric that exceeds a minimum value.

After selecting a segment, the system may determine whether 608 the selected segment is from a primary stream. The primary stream may correspond to the segments generated by a primary transcoder and provided to the system. The primary transcoder may be assigned at the start of a broadcast and may be re-assigned during a broadcast. Segments from the primary transcoder may be served to a viewer or CDN in cases where redundant segments are not available or if the quality metric of segments cannot be determined. In some cases, the primary transcoder may be used as a default transcoder where additional information is not available to determine which segment among more than one redundant segment received by the system has the highest segment quality metric. In some cases, segments from the primary stream are queued for transmission to a recipient (e.g., a CDN).

If the system determines that the selected segment is from the primary stream, the process 600 may be finished 610 as the segment from the primary stream may have already been queued for transmission to the recipient. The queued segment from the primary transcoder may subsequently be transmitted to a CDN. However, if the selected segment is from another stream, the system may replace 612 the queued segment from the primary stream with the selected segment which necessarily has a segment quality metric greater than or equal to the quality metric of the corresponding segment from the primary stream. In some cases, the system may not queue segments from the primary stream for transmission to the recipient and the system instead queues and/or transmits the selected segment with the best quality metric regardless of whether the selected segment is from the primary transcoder or another transcoder. In some embodiments, the system may store the selected segment in a repository.

Figure 7:
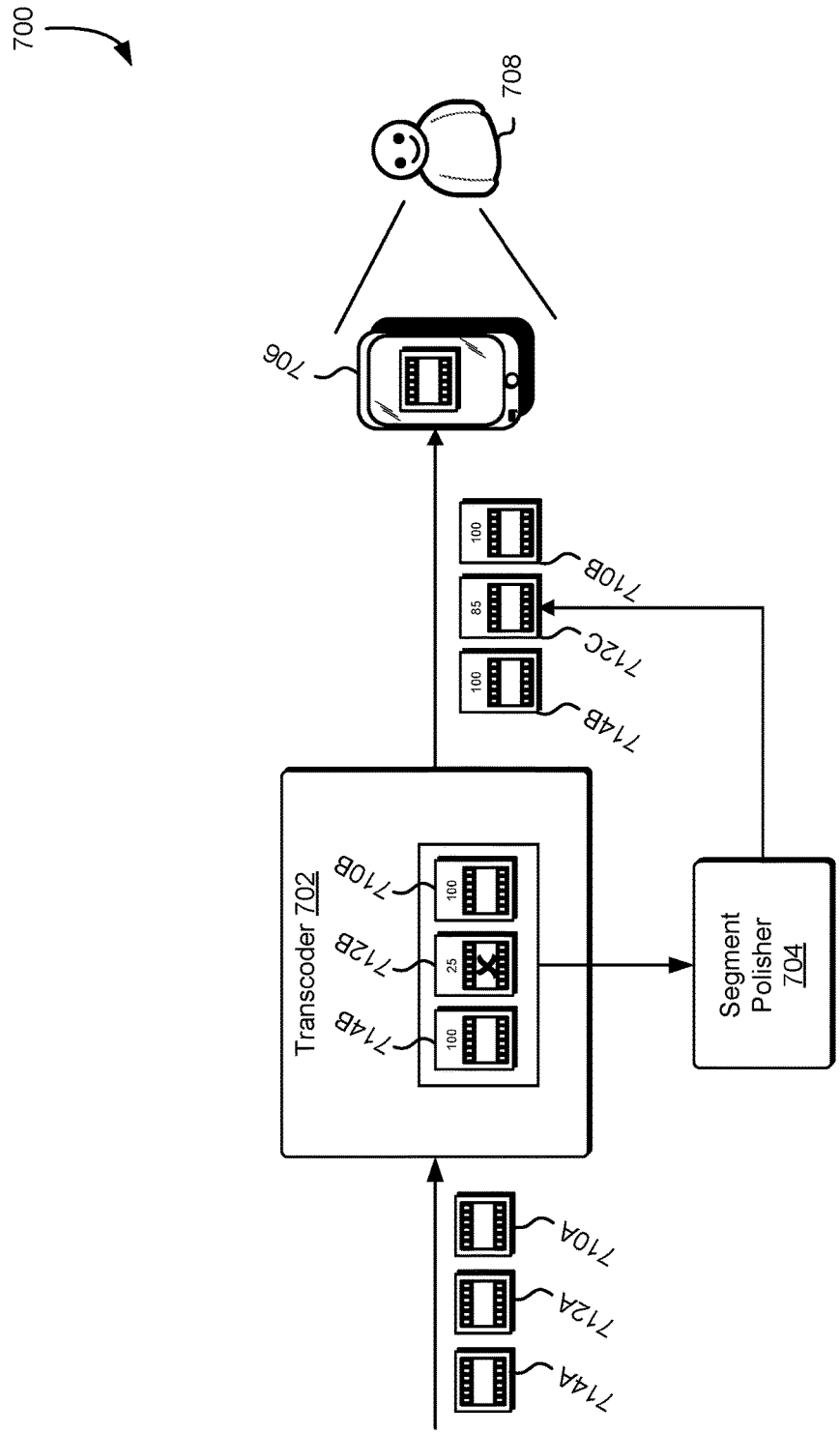
FIG. 7 illustrates an environment in which various embodiments can be implemented.

FIG. 7 illustrates an environment in which various embodiments can be implemented. The computing environment 700 illustrates a transcoder 702; a segment and/or frame polishing routine 704; and a multimedia playback device 708 that may be used to display multimedia to a viewer 708. The transcoder 702 may be in accordance with transcoders described elsewhere in this disclosure and may be implemented using hardware, software, and a combination thereof. The computing environment 700 is suitable for utilizing a segment polisher 704 to improve the segment quality metric that may be used to improve the experience of a viewer 708 that is served multimedia content.

A transcoder 702 may receive one or more multimedia input segments 710A, 712A, and 714A which may, for example, be contiguous 2-second slices of a program (i.e., broadcast of multimedia content). The transcoder 702 may receive the segments 710A, 712A, and 714A and transcode the segments. The first segment 710A may be successfully transcoded to generate a corresponding first output segment 710B and the third segment 714A may also be successfully transcoded to generate a corresponding third output segment 714B. However, one or more frames of the second input segment 712A may be subject to a frame error that also causes the segment quality metric to drop.

When a transcoded segment has a segment quality metric that is below a threshold, a segment polishing routine 704 may be utilized to improve the quality of the segment. A segment polishing routine 704 may be hardware, software, or a combination thereof that is configured to perform one or more signal processing algorithms. The segment polishing routine 704 and transcoder 702 may both include software that runs on the same physical computing device such as a server running executable code as part of the transcoder 702 and as part of the segment polishing routine 704. A segment polishing routine may be utilized to perform image processing algorithms that improve the quality metric for a segment. The segment polishing routine may be invoked either synchronously or asynchronously. A synchronous segment polishing routine may be executed as part of the transcoding workflow. When a segment is transcoded and a quality metric is encoded, the transcoder 702 or a downstream component (e.g., a multimedia delivery platform) may determine that a segment should be enhanced, synchronously invoke the segment polishing routine 704, obtain an enhanced segment from the segment polisher, and continue performing additional steps (e.g., transmitting the enhanced segment from the transcoder 702 to a CDN). An asynchronous segment polishing routine may also be executed as part of the transcoding workflow. A service separate from the transcoder may monitor the quality metrics of segments generated by the transcoder 702 and invoke a workflow to run the segment polishing routine 704 upon detecting that a generated segment has a quality metric that is below a specified threshold value. As part of the workflow, a new thread on a computing device may be generated, a virtual machine instance may be generated, etc. In general, various other types of computing environments that are acceptable for executing an algorithm can be initialized to run the segment enhancement algorithms.

Upon execution, the segment polishing routine 704 may, as part of a segment polishing routine, obtain the low-quality segment 712B, which may be provided to the segment polishing routine 704 as part of invoking the segment polishing routine (e.g., if the segment polishing routine includes a software-based function, the function may have an input parameter where the segment 712B or a reference to the segment 712B is provided). In other embodiments, the segment polishing routine 704 may issue a command to the segment 712B to obtain the segment, such as through a callback mechanism. FIG. 7 illustrates an example where the segment polisher 704 also obtains (e.g., as part of a segment polishing routine) additional frames associated with the low-quality and/or damaged frame 712B. In an example in accordance with FIG. 7, the frames that are temporally adjacent to the damaged frame 712B (i.e., the segments of the broadcast that immediately precede 710B and follow 714B the damaged segment 712B) are also obtained by the segment polishing routine 704. The segment polishing routine 704 may be operable to perform one or more enhancement techniques on a segment that improves the quality metric associated with the segment. In some cases, a segment polishing routine is performed under real-time performance constraints while in other cases the segment polishing routine may use more computationally demanding algorithms that are not performed under real-time performance constraints, such as for polishing segments to be served in on-demand and catch-up media settings.

In some embodiments, a low-quality segment is generated by a transcoder and an event-driven platform detects that the segment has a quality metric below a predetermined threshold. The quality metric falling below the threshold may be a condition that triggers the event-driven platform to asynchronously invoke a segment polishing routine that runs separately from the transcoder 702 (e.g., a virtual machine instance or other suitable computing environment is initialized in association with the trigger). In some embodiments, the event-driven platform may select the segment polishing routine 704 from among multiple segment polishers that each performs a different techniques which may be suitable in different contexts—for example, FIG. 7 may illustrate a frame error that negatively affected the quality metric of a segment 712B. The event-driven platform may inspect metadata in the segment 712B that indicates that the segment was subject to an input packet error affecting some or all frames of the segment 712B and select an appropriate segment polishing routine 704 for fixing frame errors. The event-driven platform discussed herein may be in accordance with those described below in connection with FIGS. 8 and 9.

Continuing with the example, the segment polishing routine 704 may receive the damaged frame 712B and/or settings that relate to the run-time environment (e.g., whether real-time performance constraints apply or if more extensive polishing can be performed) and perform a segment polishing routine that generates an enhanced segment 712C. The segment polishing routine may perform one or more techniques that improve the quality segment metric of the damaged segment 712B. For one or more damaged frames, the segment polishing routine 704 may perform various suitable signal processing techniques such as calculating optical flow fields and interpolating synthetic frames by estimating motions. Some signal processing algorithms may utilize frames from segments adjacent to the damaged segment—therefore, a segment polishing routine 704 may obtain the damaged segment 712B as well as adjacent segments 710B and 714B. Averaging of adjacent and nearby frames may also be utilized—for example, for a missing frame, the frames immediately preceding and following the missing/damaged frame may be averaged together (equally weighted) to generate an approximation of the missing frame which may improve the quality metric of the segment. Such averaging techniques may be enhanced to apply to multiple dropped frames. For example, consider the case where two consecutive frames are dropped. The segment polishing routine 704 may obtain the frame immediately preceding the first dropped frame and the frame immediately following the last dropped frame. Weighted averages of the immediately preceding and immediately following frames may be used to generate the two missing frames. The first dropped frame uses a weighted average that has a higher weight towards the preceding frame and the second dropped frame uses a weighted average that has a higher weight towards the trailing frame. The enhanced segment 712C generated by the segment polishing routine 704 may be returned to the transcoder 702 and the transcoder may provide the enhanced segment 712C in place of the damaged segment 712B to downstream entities (e.g., a multimedia delivery platform, a content delivery network, or a viewer's multimedia playback device). As a result, the viewer 708 may have a more pleasant multimedia viewing experience.

Figure 8:
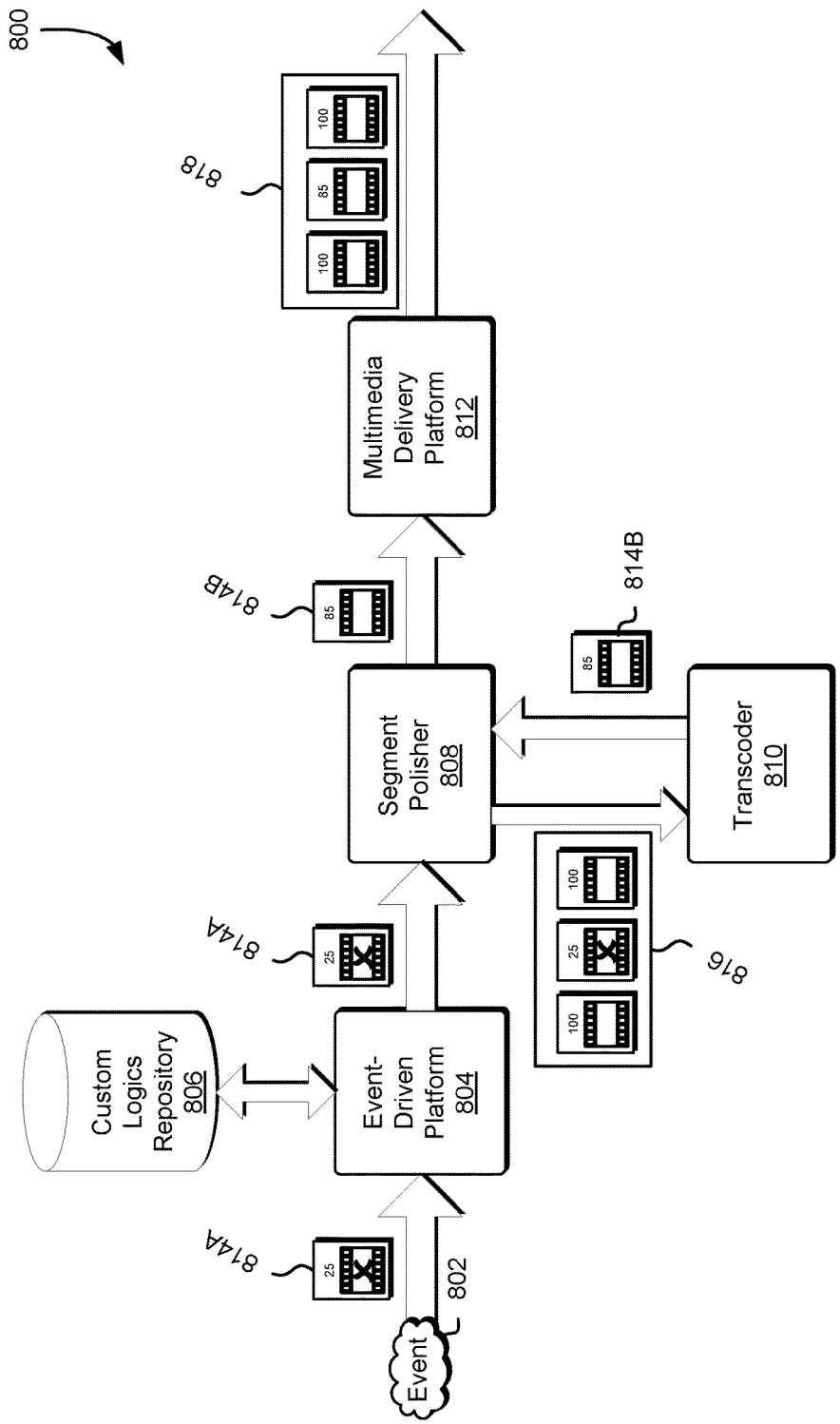
FIG. 8 illustrates an environment in which an event may trigger an event-driven platform to invoke a routine to enhance, correct, or polish the quality of a multimedia segment.

FIG. 8 illustrates an environment in which various embodiments can be implemented. The computing environment 800 illustrates an example where a segment polisher may be invoked in response to the detection of one or more conditions being satisfied. Various types of events 802 may trigger the system to cause a segment to be polished. For example, the quality metric of the segment may be below a threshold value. As a second example, after a live broadcast has finished, segments of the broadcast may be polished so that viewers that request to watch the show later (e.g., using an on-demand media service) can have higher quality segments available. The computing environment 800 illustrates an event 802; an event-driven platform 804; a custom logics repository 806; a segment polishing routine 808; a transcoder 810; a multimedia delivery platform 812; a multimedia segment 814A in connection with the event 802; an output segment 814B generated by the transcoder 810; a first collection of segments 816 received by the transcoder; and a second collection of segments 818 transmitted by the multimedia delivery platform.

An event-driven platform 804 may determine when an event occurs and perform custom logic in response to the event being triggered. An event trigger may, for example, be the detection of a segment having a quality metric below a threshold value or the completion of a broadcast. The event-driven platform 804 may be implemented using software, hardware, or some combination thereof. In some embodiments, distributed computing resources may provision and load custom logic/code in response to the event, run the code, and then unload the code and de-provision the computing resource. The event-driven platform 804 may be hosted as a component of a data center such as those described above in connection with FIG. 3. An event-driven platform 804 may be implemented using an event-driven architecture. When a segment is transcoded, the event-driven platform 804 may be notified (e.g., by the transcoder itself or a polling service that monitors the quality metrics of segments generated by one or more transcoders) that a multimedia segment has been created and the event-driven platform may then obtain the newly generated segment, determine whether conditions for triggering a segment polisher have been satisfied (e.g., inspecting segment and/or frame metadata), and specify custom code or logic that should be run in response to any conditions that are satisfied. In some embodiments, a backend system may have a task scheduler that may be used to schedule periodic tasks. In some embodiments, when a segment is transcoded, the transcoder may programmatically notify the event-driven platform that a new segment has been transcoded and the event-driven platform may receive the notification and schedule a task to be run to re-transcode the segment at a later time.

The event-driven platform may have access to a repository of custom logics 806. The repository 806 may be any suitable storage system and may include hardware, software, and a combination thereof. The custom logics repository may be a part of the event-driven platform 804 (e.g., an in-memory data structure of the event-driven platform 804). The repository 806 may include an association between trigger conditions to custom logics to be invoked upon satisfaction of the associated trigger. The repository may be implemented using a database, data structures such as a map data structure (i.e., an associative array), and any combination thereof. For example, there may exist an association between a frame error event and a custom logic for computing optical flow fields that may be used to mitigate the frame error. When an event 802 is received by the event-driven platform 804, the event-driven platform 804 may access the custom logics repository 806 and obtain the custom logic corresponding to the event 802. For example, in a database, a table may be indexed or sorted using an event identifier as the sorting key. If the repository 806 is implemented as an associative array, the event conditions may be the keys of the array and the custom logics may be the values bound to the keys. Note that in some embodiments, custom logic may include large amounts of executable code, and a reference to the code may be included in the database entry, associative array value, etc., so that the executable code is obtainable from the repository 806 via one or more levels of indirections. For example, the database record for the custom logic may include a uniform resource identifier (URI) that the event-driven platform 806 may use to request the executable code; for an associative array, the binding value may be a pointer that references the executable code. In some embodiments, a client of the system may create, read, update, and delete custom logics from the repository 806. For example, an upstream CDN can provide the custom logic to be performed under certain conditions. One or more default logics may exist as well f- or example, a default logic may be to display an error slate when a predetermined number of segments are blank.

After using the event to obtain custom logic associated with the event, the event-driven platform 804 may invoke the custom code. In FIG. 8, the event 802 may be triggered by the quality metric of a segment 814A being below a threshold value due to a frame error. In some cases, a downstream component such as a content delivery network may specify the threshold metric. The event-driven platform 804 may receive the event and the segment 814A, inspect the segment 814A metadata to determine that the quality of the segment degraded due to a frame error and obtain a frame error mitigation custom logic using the repository 806. The segment polishing routine 808 shown in FIG. 8 corresponds to the custom logic that is obtained and invoked by the event-driven platform 804 in response to the event 802.

The segment polishing routine 808 shown in FIG. 8 may be invoked by the event-driven platform 804. In some embodiments, the segment polisher routine may be executed on virtual machine instance of a distributed computing platform. The segment polisher 808 may be in accordance with those described elsewhere in connection with FIG. 7. The segment polishing routine 808 may receive the low-quality segment 814A and perform one or more signal processing techniques to improve the quality of the segment 814. For example, the segment polisher 814A may obtain adjacent segments and use a collection of segments 816 to perform various suitable signal processing techniques such as creating optical flow fields and interpolating synthetic frames by estimating motions. A transcoder 810 may be used to transcode an enhanced 814B segment corresponding to the content of the low-quality segment 814A. The enhanced segment 814B generally has a better quality metric than the low-quality segment 814A. The segment polishing routine 808 may provide the enhanced segment 814B to a multimedia delivery platform 812.

The multimedia delivery platform 812 shown in FIG. 8 may be in accordance with multimedia delivery platforms described elsewhere in this disclosure such as in connection with FIGS. 1-7. The multimedia delivery platform 812 may receive the enhanced segment 814B from the segment polishing routine 808. Upon receiving the enhanced segment 814B, the multimedia delivery platform 812 may take various appropriate steps such as accessing and replacing the low-quality segment with the enhanced segment. The segments 818 may be transmitted to downstream entities such as CDNs and multimedia playback devices and presented to a viewer. The viewer may, as a result of having received the enhanced segment, enjoy higher quality multimedia as compared to systems that do not perform polishing routines. The multimedia delivery platform 812 may also replace any copies of the low-quality segment that may have been stored and/or cached, such as in a multimedia repository described elsewhere in connection with FIG. 4. In some embodiments, the multimedia delivery platform 812 may receive the enhanced segment 814A, inspect the quality metric of the enhanced segment, and indicate to the event-driven platform 804 that the segment is still of an unacceptable quality (e.g., the enhanced segment also has a quality metric below the threshold value). Additional polishing routines may then be performed or an error may be returned indicating that there are no further enhancement routines to be performed.

Figure 9:
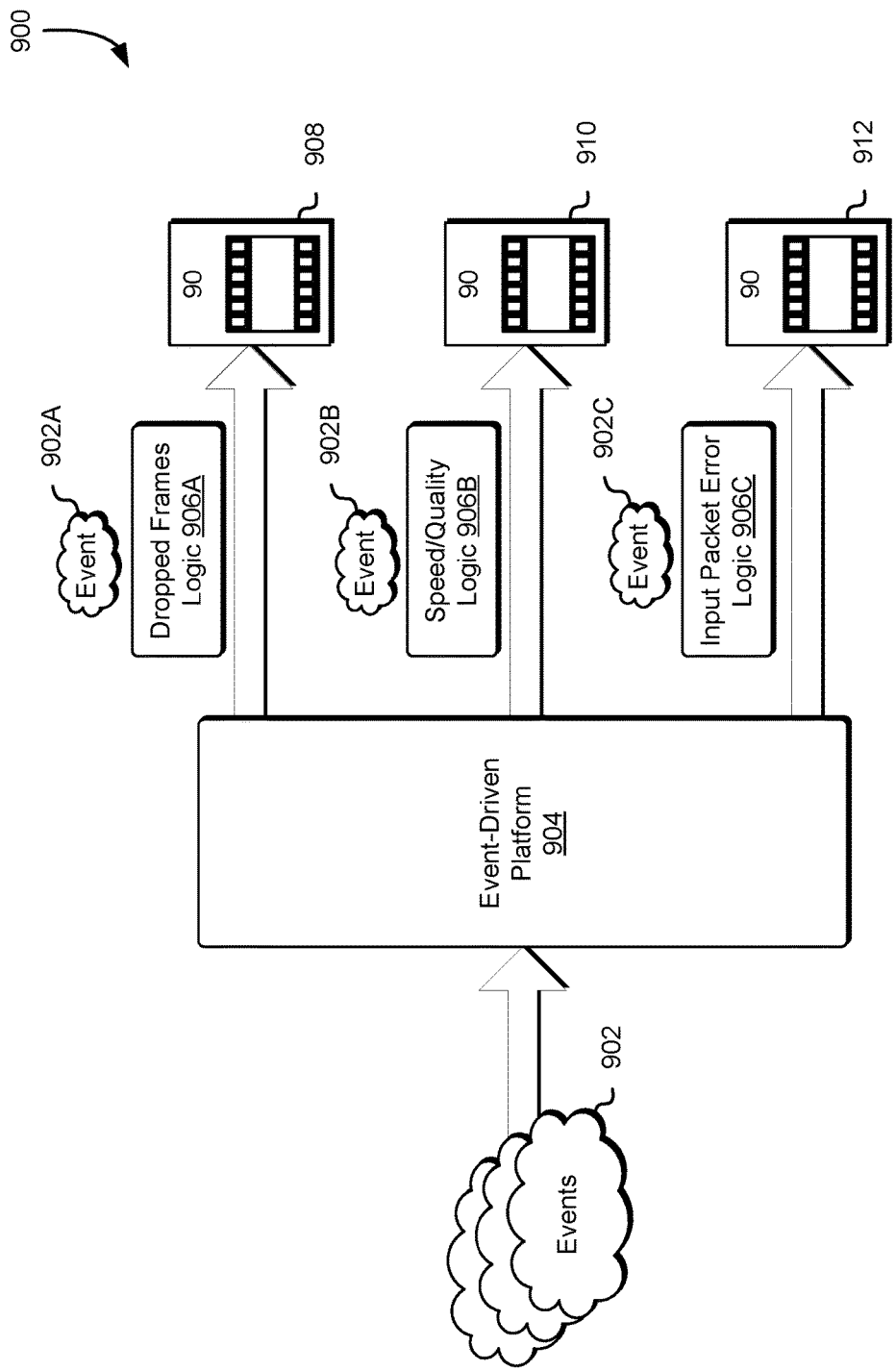
FIG. 9 illustrates an environment in which an event-driven platform may select from multiple custom logics based on the type of transcoding error detected.

FIG. 9 illustrates an environment in which various embodiments can be implemented. The computing environment 900 illustrates an example where an event-driven platform 904 may be utilized to invoke various custom logics. An event-driven platform 904 may receive and/or monitor events 902 in the manner described above. In some embodiments, the events that the event-driven platform 904 monitors include transcoding multimedia. An event-driven platform 904 may receive a notification that indicates a multimedia input has been transcoded and inspect the notification to determine whether to invoke various types of business logic based on the outcome of the transcoding operation.

The event-driven platform 904, which may be implemented in accordance with those described above in connection with FIGS. 7 and 8, may be further configured to receive events from multiple transcoders. The event-driven platform 904 may receive the events 902 and determine, either internally (e.g., using a component of the event-driven platform) or externally (e.g., by delegating to another service) how to splice the events which may operate on different logics and/or different tables. As an example, the event-driven platform 904 may include a mapping of custom logics to corresponding types of transcoding errors.

Custom logic 906A, 906B, and 906C may include executable code, routines, function pointers, input parameters to a routine, callback functions, API requests, or any combination thereof. As an example, the event-driven platform 904 may include a mapping of polishing routines to events that indicate which routines should be invoked. Invoking a routine may include executing code or providing executable code as part of a request. FIG. 9 shows multiple events 902 that are received by the event-driven platform 904 and spliced such that custom logic is run based on the type of error that caused the segment to have degraded quality. The custom logic 906A that is run in response to a first event 902A may be different from the custom logic 906B that is run in response to a second event 902B but need not be the case—the custom logic may, in some cases, be the same either literally (e.g., both events utilize a function pointer that runs the same executable code from memory) or logically (e.g., the same functional outcome). In some cases, the custom logic may use information included in the events 902A, 902B, and 902C to perform a workflow.

The enhanced segments 908, 910, and 912 may be outputs generated by various custom logics that may incorporate different signal processing techniques for enhancing multimedia quality. For example, the event-driven platform 904 may receive a first event 902A indicating a segment quality metric was below a threshold value. The event-driven platform 904 may inspect the frame and/or segment metadata and determine that a frame error affected the segment quality metric and obtain custom logic 906A for handling dropped frames. The custom logic may be a type of segment polisher that executes a signal processing technique for mitigating frame drop errors and generates an enhanced segment 908 which has an improved segment quality metric as compared to the segment that triggered the event 902A. A second event 902B may indicate that the segment quality metric was degraded due to a speed/quality tradeoff. The event-driven platform 904 may invoke custom logic 906B that reserves additional computing resources and re-transcodes the original segment to ensure adequate computing resources are available to be utilized by the transcoder. The result may be that an enhanced segment 910 is generated having an improved quality metric. For a third event 902C, there may be an indication that an input packet error occurred. The event-driven platform 904 may use the event 902C to trigger custom logic 906C that performs one or more error detection and correction algorithms that corrects the input packet error and recovers the source packet, and transcodes the recovered media to produce an enhanced segment 912. Of course, other types of events may trigger other types of custom logics in addition to those illustrated in FIG. 9.

Figure 10:
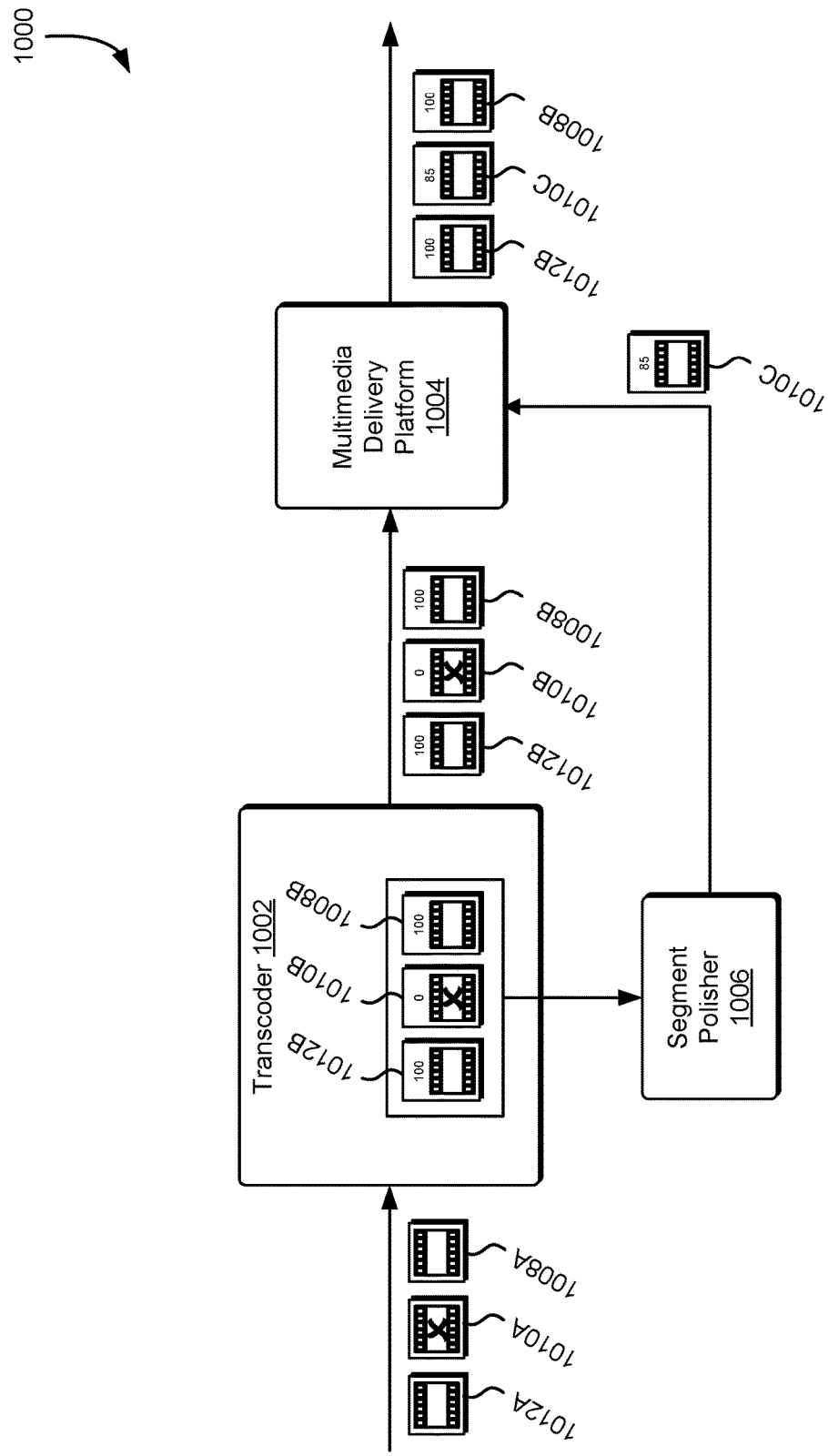
FIG. 10 illustrates an environment in which an enhanced segment is dynamically injected into a multimedia stream by a multimedia delivery platform.

FIG. 10 illustrates an environment in which various embodiments can be implemented. The computing environment 1000 illustrates a transcoder 1002; a multimedia delivery platform 1004; and a segment polishing routine 1006. The transcoder 1002 may be in accordance with transcoders described elsewhere in this disclosure and may be implemented using hardware, software, and a combination thereof. The transcoder 1002 may be configured to receive input segments 1008, 1010, and 1012, which are transcoded by the transcoder 1002. The computing environment 1000 is suitable for utilizing the transcoder 1002 in conjunction with a multimedia delivery platform 1004 and a segment polishing routine 1006 to improve the quality of segments that are served to downstream entities.

The transcoder 1002 may be in accordance with transcoders discussed elsewhere in connection with FIG. 7. The transcoder 1002 may receive input multimedia segments 1008A, 1010A, and 1012A. They may, for example, be contiguous 2-second slices of a program (i.e., broadcast of multimedia content). The transcoder 1002 may receive the segments 1008A, 1010A, and 1012A and transcode the segments. The first segment 1008A may be successfully transcoded to generate a corresponding first output segment 1008B and the third segment 1012A may also be successfully transcoded to generate a corresponding third output segment 1012B. However, the second input segment 1008A may be subject to an input packet error that causes the segment quality metric to drop and causes the transcoding to fail. A blank slate may be generated such that the second output segment 1010B has a low quality metric due to the input packet error. In some embodiments, the transcoder provides each of the transcoded segments 1008B, 1010B, and 1012B to a downstream entity such as the multimedia delivery platform 1004 shown in FIG. 10.

The segment polishing routine 1006 may be in accordance with segment polishers and custom logics described above in connection with FIGS. 7-9. The segment polishing routine 1006 may be invoked in response to an event-driven platform (not shown in FIG. 10) detecting that the segment quality metric of a segment 1010B is below a threshold metric. In some cases, additional segments such as temporally adjacent segments 1008B and 1012B may also be proved to (or obtained by) the segment polishing routine 1006. The segment polisher 1006 may perform signal processing techniques (such as by creating optical flow fields and interpolating synthetic frames by estimating motions) and other mitigations to generate an enhanced segment 1010C that may be used in place of the low-quality segment 1010B. The segment polishing routine 1006 may provide the enhanced segment 1010C to a multimedia delivery platform 1004.

The multimedia delivery platform 1004 may be in accordance with multimedia delivery platforms described elsewhere in this disclosure such as those described in connection with FIGS. 1-8. In some embodiments, the multimedia delivery platform 1004 receives segments 1008B, 1010B, and 1012B from a transcoder as part of a multimedia stream. The multimedia delivery platform 1004 may be configured to perform various functions, such as selecting and inserting advertisements in the stream (e.g., based on metadata included in a manifest indicating an ad marker). The multimedia delivery platform 1004 may also be configured to dynamically inject the enhanced segment 1010C to the broadcast stream. For example, the multimedia delivery platform 1004 may receive the segments 1008B, 1010B, and 1012B from the transcoder 1002, and prior to transmitting the second segment 1010B, the multimedia delivery platform 1004 may also receive the corresponding enhanced segment 1010C. The multimedia delivery platform 1004 may be configured to replace the low-quality segment 1010B with the corresponding enhanced segment 1010C that has a better quality metric. The segments 1008B, 1010C, and 1012B may be provided to a downstream entity such as a content delivery network or a multimedia playback device.

It should be noted that the improvements described in connection with FIG. 10 may also be implemented in connection with the improvements described elsewhere in this disclosure. As an example, the computing environment 1000 may be extended to include a secondary transcoder such as in the manner described in connection with FIGS. 1-6. The transcoder 1002 may be designated as the primary encoder, and the multimedia delivery platform 1004 may receive two redundant streams. Continuing with the example, the transcoder 1002 may provide the low-quality segment (quality metric=0) to the multimedia delivery platform 1004 and the secondary transcoder may provide a corresponding segment having a quality metric X. The multimedia delivery platform 1004 may receive the enhanced segment 1010C (quality metric=85) and determine whether to use the enhanced segment or the corresponding segment provided by the secondary transcoder based on whether the segment generated by the secondary transcoder has a better quality metric than the enhanced segment 1010C. In general, the multimedia delivery platform 1004 may receive an enhanced segment from an asynchronous workflow (such as the segment polisher 1006 shown in FIG. 10) and compare the enhanced segment received asynchronously with the best quality segment received from two or more redundant transcoders to determine which segment should be used.

It should be noted that in some embodiments, the multimedia delivery platform 1004 receives a stream of multimedia segments (e.g., segments 1008B, 1010B, and 1012B shown in FIG. 10) that includes a low-quality segment 1010B and transmit those segments as part of a multimedia output stream to a playback device that is requesting the stream under real-time constraints. In some cases, a polished segment 1010C is not available until a later point in time so that an enhanced segment 1010C may be used for catch-up viewers or on-demand viewers. For example, the multimedia delivery platform 1004 may provide a first multimedia output stream to a first client under live constraints including the low-quality segment 1010B and, at a later time, provide a second multimedia output stream to a second client (e.g., an on-demand viewer) that includes the enhanced segment 1010C from a segment polisher.

Figure 11:
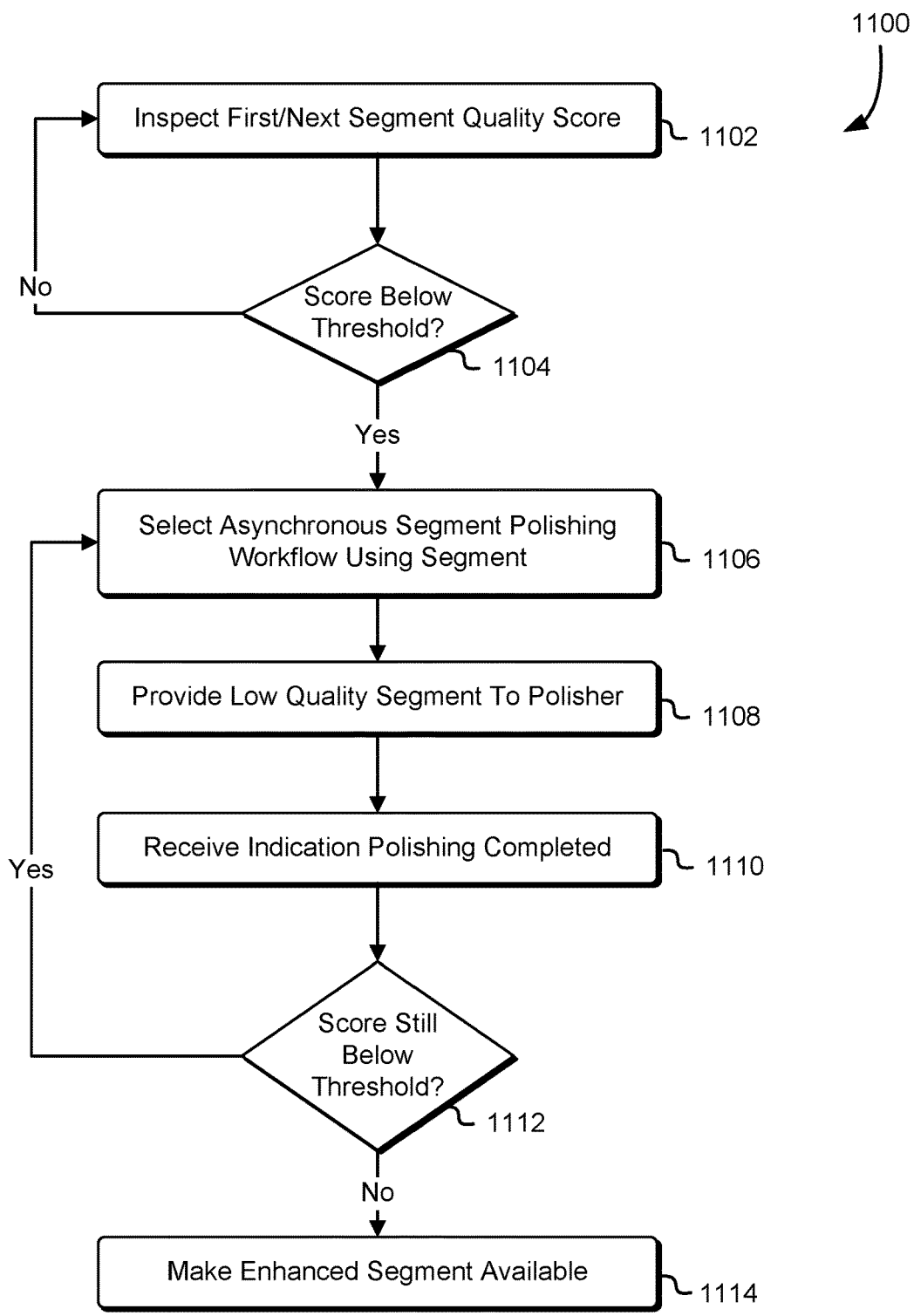
FIG. 11 illustrates a process of an asynchronous workflow for generating enhanced multimedia segments.

FIG. 11 shows an illustrative example of a process 1100 of an asynchronous workflow for generating enhanced multimedia segments. Generally, the process 1100 may be performed by any suitable system such as the event-driven platform described elsewhere in connection with FIGS. 7-10. In an embodiment, the process includes inspecting 1102 the quality metric of a first segment. The segment may be a transcoded segment generated by a transcoder such as those described in connection with FIGS. 1-10. The system performing the process 1100 may use hardware, software, or a combination thereof to perform the process. In some embodiments, the process may be performed in a distributed environment, such as on a virtual machine instance running on a server that is in a data center configured to fulfill requests from multiple requestors (e.g., clients of the data center or service provider).

The system may check 1104 whether the quality metric of the segment is below a threshold. The system may perform further evaluations such as whether individual frames have frame quality metrics below a threshold (which may be a different threshold from the segment's quality threshold value). Furthermore, the system may also check segment and/or frame metadata to determine whether to perform an asynchronous workflow. Certain types of metadata may adjust the threshold value up or down. If the system determines that the segment quality metric exceeds a segment threshold value and that other conditions are satisfied (e.g., all segments are above a frame threshold value as well), the system may continue to monitor the system for additional segments. The next segment will be checked in the same or similar manner, and in some cases the system will determine that the segment's quality metric does not meet the threshold value or other indicators that an asynchronous workflow should be performed. In some cases, the system will perform an asynchronous workflow based on segment and/or frame metadata even if the quality metric exceeds the threshold value. An example is where a dropped frame error is detected—the system may perform a mitigation for dropped frames regardless of the quality metric of the segment.

The system may select 1106 an asynchronous workflow. The workflow may be selected from a custom logics repository using a mapping between the event and custom logics corresponding to the event. In some cases, the event is the low quality metric itself—in other cases, the system may inspect metadata that indicates a cause of the quality metric degradation and access a custom logic corresponding to the particular cause. The event-driven platform and repository may be implemented in the manner described above in connection with FIG. 8. The system may initialize an environment for performing the segment polishing routine and provide 1108 the segment that triggered the event to the segment polisher. The segment polishers may be in accordance with those described above in connection with FIG. 9 and utilize techniques for enhancing segment quality described elsewhere in this disclosure.

The system may receive 1110 an indication that the segment polishing routine has completed. In some cases, the indication may be a notification or callback to the event-driven platform. In some cases, the generation of a new segment may serve as the indication that polishing has completed. The system may then check 1112 whether the enhanced segment has a quality metric that is still below a threshold. If the segment quality metric is still below the threshold value, more complex enhancement techniques may be used. For example, a segment that has a frame error may go through a first segment polishing routine that involves using weighted averages of adjacent frames to approximate the dropped frame. Upon completing the enhancement using weighted averages, the system may generate a segment quality metric and determine that the segment is still of a poor quality. The system may then perform a second-pass at polishing the segment by utilizing more complex signal processing techniques such as creating optical flow fields and interpolating synthetic frames by estimating motions. It should be noted in some cases, the first-pass segment polishing routine is used under real-time performance constraints and the second-pass segment polishing routine is more complex and not performed under real-time performance constraints. In such an example, it may be the case that live broadcast viewers are served the enhanced segment from the first-pass polishing routine and on-demand viewers are served the enhanced segment from the second-pass polishing routine. If the threshold metric satisfies the threshold condition, the system may make the enhanced segment available 1114 to a downstream entity such as a multimedia delivery platform.

Figure 12:
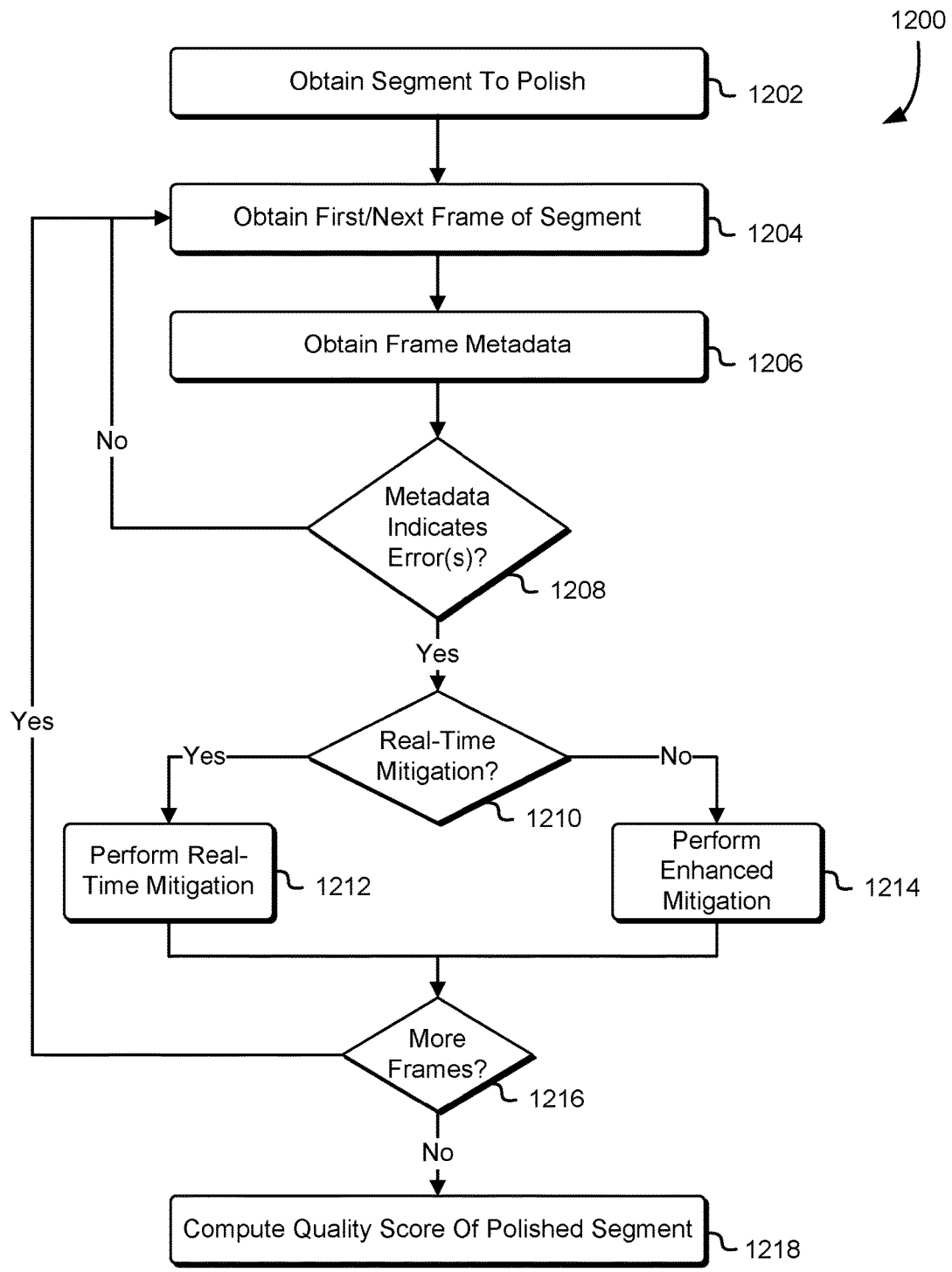
FIG. 12 illustrates a process for generating enhanced multimedia segments.

FIG. 12 shows an illustrative example of a process 1200 of a segment polishing routine for generating enhanced multimedia segments. Generally, the process 1200 may be performed by any suitable system such as in connection with the event-driven platform described elsewhere in connection with FIGS. 7-11. In an embodiment, the process 1200 includes obtaining 1202 a multimedia segment to polish. The segment may be provided to a segment polisher by an event-driven platform after the event-driven platform determines that the particular segment polisher should be invoked.

The system may obtain 1204 the first frame of the segment and obtain 1206 the corresponding frame metadata. If the frame metadata does not indicate 1208 an error, the system may obtain the next frame of the segment and continue to check frames until a frame has metadata indicating an error. It should be noted that the process 1200 described in FIG. 12 is merely an example and there are various segment polishing routines which do not sequentially inspect frames of a segment. For example, a segment may have additional metadata (e.g., in the segment manifest) that indicates which frames of the segment are subject to an error. As a second example, in the case of a lack of CPU cycles, the system may simply treat the segment as a whole and re-transcode the entire segment.

In some embodiments, the system determines whether 1210 to perform a real-time mitigation. A real-time mitigation 1212 may be a polishing routine that is to be completed in a time-sensitive nature. For example, in a live broadcast, the system may have a limit of tens or hundreds of milliseconds to perform a mitigation for a segment that is two-seconds in length. An example of a real-time mitigation is a weighted averaging of adjacent frames as a mitigation for a dropped frame error. Conversely, an enhanced mitigation 1214 may include the use of signal processing techniques which are not performed under real-time performance constraints and may be able to use more computationally complex algorithms to generate an output segment having higher quality. The system may check whether there are more frames 1216 in the segment to polish and, after the entire segment is polished, compute 1218 a new quality metric for the polished segment. The polished segment may have its quality metric encoded in a manifest. Additionally, individual frames of the segment may also have frame quality metrics encoded, and additional metadata may be included in either quality metrics.

Figure 13:
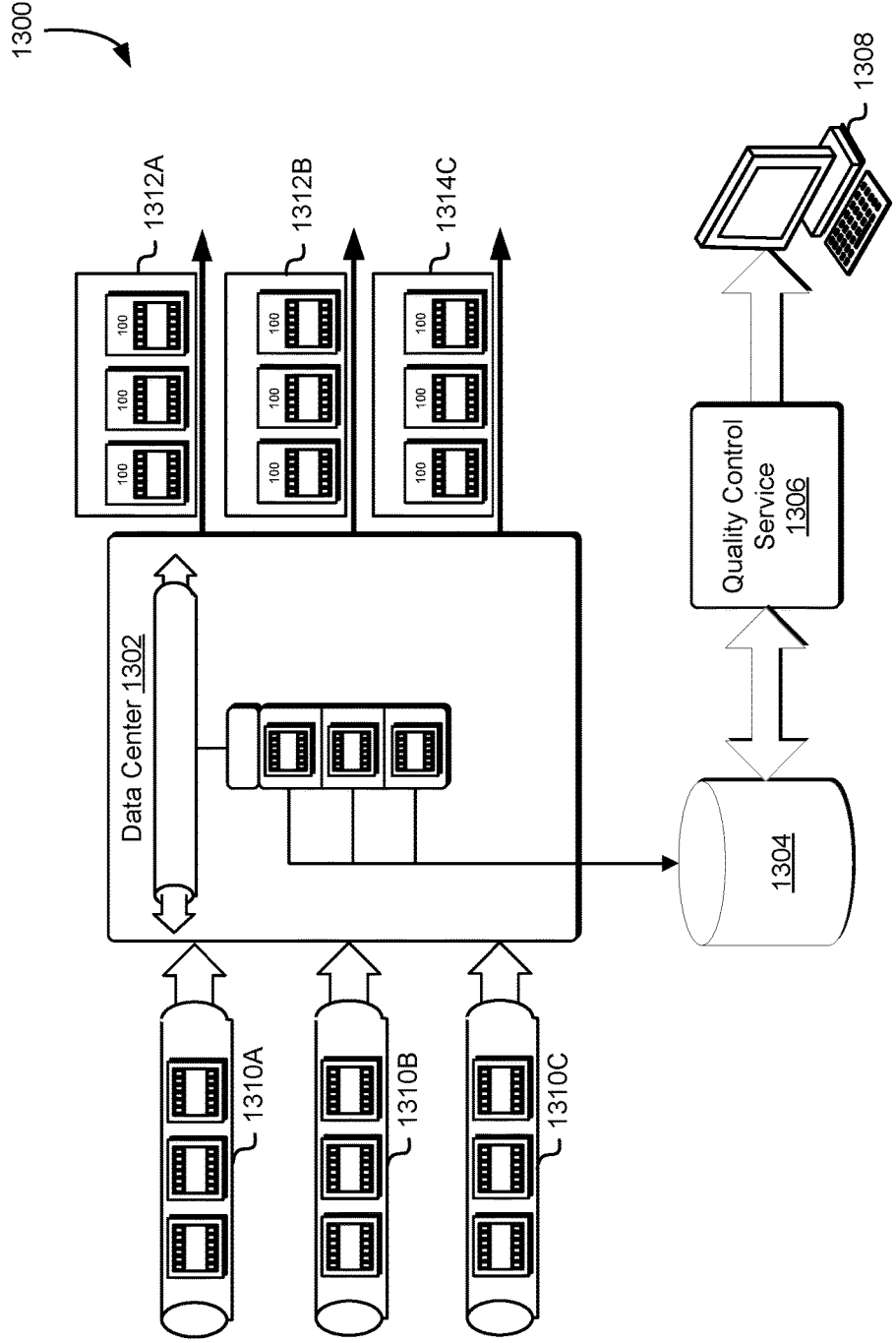
FIG. 13 illustrates an environment in which various embodiments can be implemented.

FIG. 13 illustrates an environment in which various embodiments can be implemented. The computing environment 1300 illustrates a data center 1302; a logging system 1304; a quality control service 1306; and a console 1308 that may be used by a system administrator. Various techniques may be practiced in the computing environment 1300 for monitoring the quality of multimedia segments generated by computing resources of the data center. In some embodiments, a data center may be used to stream multiple broadcasts simultaneously using multiple transcoders in a distributed manner. In such a system, it may be desirable to implement a quality control service that may be used to detect and root cause issues that can cause degradation of services such as transcoding services.

The data center 1302 illustrated in FIG. 13 may be in accordance with data centers described elsewhere in this disclosure (e.g., in connection with FIG. 3). The data center may be configured to receive requests from multiple requestors to perform various computing-related services. FIG. 13 illustrates three multimedia input streams 1310A, 1310B, and 1301C that are provided to the data center 1302 to perform transcoding services. The multimedia input streams may be redundant streams of the same underlying multimedia content or may be unrelated content. The data center 1302 may also receive requests which are unrelated to transcoding services, such as described above in connection with FIG. 3. The data center 1302 may be physically organized to have multiple top-of-rack switches connected to multiple servers. FIG. 13 provides an illustrative example where a data center 1302 receives multimedia input streams and transcodes the input streams using computing resources of the data center. FIG. 13 illustrates three separate servers performing transcoding services.

As with embodiments described elsewhere in this disclosure, the transcoders may be used to transcode input multimedia of one type to an output multimedia of a second type. The multimedia outputs may be produced as segments having corresponding segment quality metrics. The multimedia output segments 1312A, 1312B, and 1312C may be provided to a downstream entity such as a multimedia delivery platform or a content delivery network and eventually the media may be served to a viewer.

Computing resources of the data center 1302 may include hardware-based computing devices such as servers, but may also include software-based computing devices such as virtual machine instances. The computing resources of the data center 1302 may be used to perform transcoding services on behalf of one or more clients. As discussed elsewhere in this disclosure, multimedia segments generated by transcoders may be encoded with a segment quality metric (e.g., in a manifest associated with the segment). Additionally, in some embodiments an event-driven platform may monitor segment quality metrics and perform enhancement techniques where appropriate. The computing environment 1300 may be configured to log quality control information entries with regard to transcoding services. The logs may be stored in a logging system 1304 which is accessible to a quality control service 1306.

Quality control information entries may include various types of data. In general, quality control information includes information regarding a segment that is transcoded and granular information regarding the computing environment in which the segment was transcoded. A quality control information entry may include a reference to a segment that is transcoded (e.g., a URI that may be used to access a multimedia segment stored in a multimedia repository in accordance with FIG. 4), the sequence of the segment, information about the transcoding input format and/or the transcoding output format, the segment quality metric, indications of errors and the types of errors, and any combination thereof. The logging entry may also include granular information about the computing environment in connection with the transcoding operation including an identifier for the physical machine used to perform the transcoding operation (e.g., machine access control address), the type of hardware used to perform the transcoding operation (e.g., the CPU processor type, GPU processor type, available memory, and more), and more. In some cases, more verbose logging may be available, and may additionally include memory dumps and telemetry data that may be useful in the context of diagnosing unexpected programmatic behavior. Additional metrics relating to the transcoding operation may be included in the quality control information entry as well, such as the time the transcoding operation occurred (e.g., a timestamp of when the transcoding operation started and/or ended), how long the transcoding operation took to run, and more.

The quality control information entries may be stored in a logging system 1304. The logging system 1304 may be any such suitable storage medium for logging data and may include hardware, software, or a combination thereof. The logging system 1304 may utilize structured storage such as a database to store and retrieve quality control information entries in an efficient manner. For example, the entries may be indexed on the MAC address and transcoding time so as to determine the performance of a particular computing resource over time. It may be the case that the quality metrics of segments transcoded by a particular server degrade gradually over time regardless of what type of multimedia input is provided. Alternatively, a particular segment of a particular media file may be subject to transcoding errors across multiple computing contexts. This may indicate that there is something wrong with the particular media file rather than a problem with the computing resources.

A quality control service 1306 may monitor and evaluate quality control information that is logged. The quality control service 1306 may be implemented using hardware, software, and a combination thereof. In some embodiments, the quality control service may operate as a backend service component that periodically polls the contents of the logging system 1304, detects abnormal states that may cause low-quality multimedia segments to be generated, and to perform additional analysis on data sets available through the logging system 1304. In some embodiments, the quality control service 1306 may utilize an event-driven platform. For example, an event-driven platform may be used to implement a periodic polling schedule to run the quality control service 1306 at regular intervals by using a time-based event to trigger a custom logic that invokes the quality control service 1306. The quality control service may be a software module, executable code, and more. The event-driven platform may be in accordance with those described elsewhere in this disclosure, such as in connection with FIGS. 7-12. An event-driven platform can also be used to cause the quality segment service 1306 to be invoked based on event triggers such as detection of quality segment metrics falling below a certain threshold on a computing device, based on a run of several segments progressively having lower and lower quality metrics, and more.

The quality control service 1306 may be configured to perform processes for detecting and diagnosing abnormal quality metrics. The quality control service 1306 may inspect quality metrics such as the quality control information entries stored in the logging system and may use an aggregate view of the collected metrics to determine whether the abnormal quality metric detected indicates a problem that is actionable to a system administrator. In some cases, the system may determine that the abnormal quality metric indicates a problem that should be surfaced to a system administrator via a console 1308 which may be a computing device. A system administrator may be alerted to such a trend and may take appropriate action, such as replacing servers whose performance has degraded over time, deprioritizing the use of such servers, etc. In some cases, detecting abnormal quality metrics can flag multimedia segment outputs beyond a threshold for visual quality experts on content providers to review. This type of logging can improve the process of root causing problems with transcoders and help developers replay tricky inputs to reproduce a sequence of events that lead to a degraded state.

Figure 14:
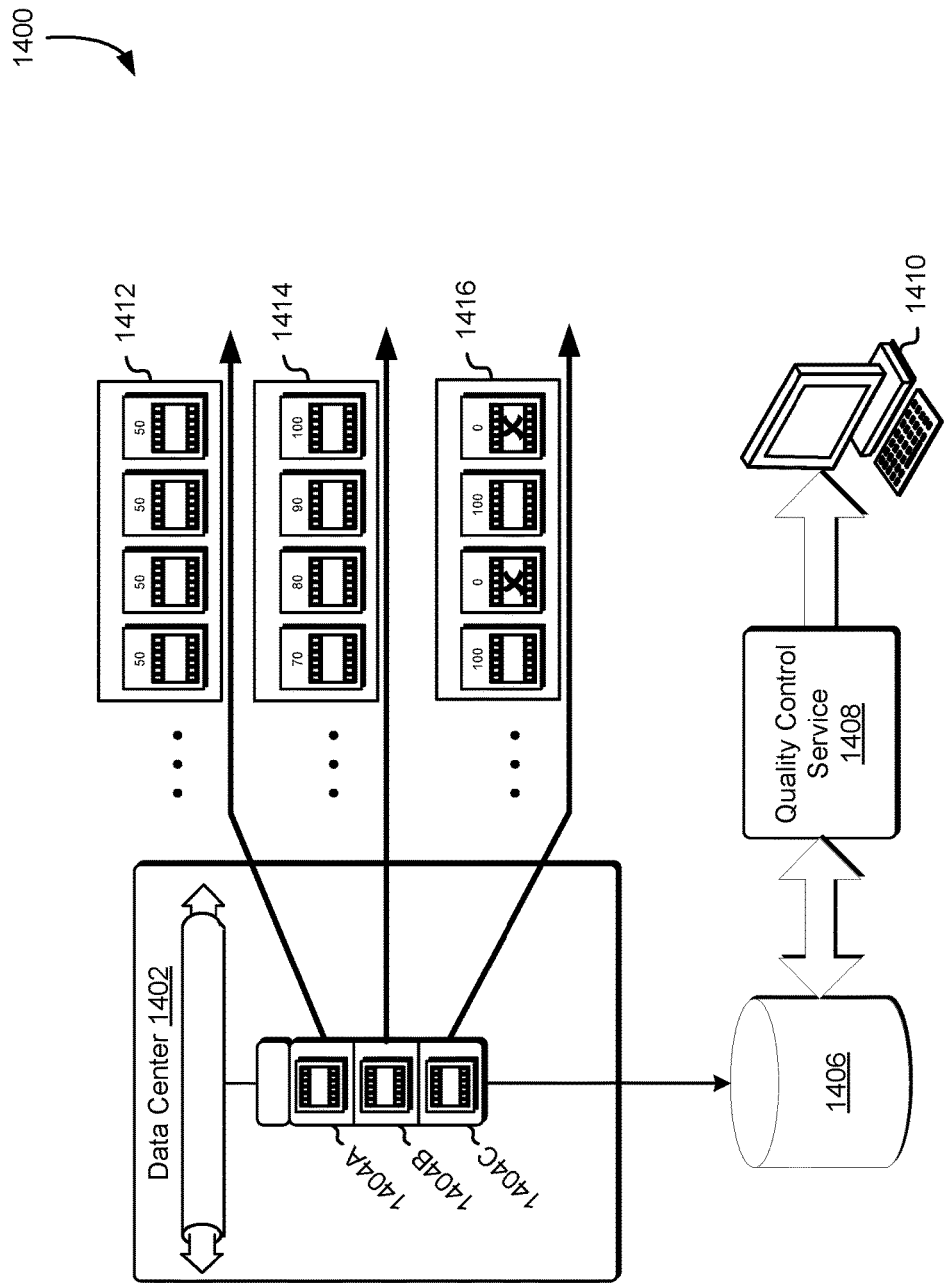
FIG. 14 illustrates an environment in which a quality control service may be configured to detect various types of abnormal operations.

FIG. 14 illustrates an environment in which various embodiments can be implemented and provides examples of abnormal conditions that may be detected by a quality control service. The computing environment 1400 illustrates a data center 1402; computing resources 1404A, 1404B, and 1404C of the data center; a logging system 1406; a quality control service 1408; and a console 1410 that may be used by a system administrator. Various techniques may be practiced in the computing environment 1400 for monitoring the quality of multimedia segments generated by computing resources of the data center. In such a system, it may be desirable to implement a quality control service that may be used to detect and root cause issues that can cause degradation of services such as transcoding services.

The data center 1402 shown in FIG. 14 may be in accordance with data centers described elsewhere in this disclosure such as those discussed in connection with FIGS. 3 and 13. The data center 1402 may include multiple servers 1404A, 1404B, and 1404C which may be used to fulfill requests such as requests to transcode multimedia inputs. The servers may be organized so that several servers are connected to a top-of-rack switch which in turn links the servers of the rack to the rest of the data center 1402. FIG. 14 shows an example computing environment 1400 where a first server 1404A transcodes a first multimedia stream 1412, a second server 1404B transcodes a second multimedia stream 1414, and a third server 1404C transcodes a third multimedia stream 1416. Multimedia input streams (not shown in FIG. 14) may be received by the data center 1402 which are routed to transcoders of the data service. The multimedia being transcoded may be independent of each other and have different underlying multimedia content. Quality control information entries may be stored in a logging system 1406. The logging system 1406 may be in accordance with those described above in connection with FIG. 13.

The quality control service 1408 may be configured to detect various types of abnormal operations. In complex computing environments, components of a system may fail for various reasons. The quality control service 1408 may be provisioned with logic to detect patterns that indicate various types of failures. FIG. 14 illustrates several examples in which a quality control service 1408 may be used to detect abnormal operations. In each case, a cross-section of the logs may be used to detect abnormal operations that share a common characteristic.

As a first example, the first server 1404A may generate a first multimedia output stream 1412 having a consistent but low quality metric. As an example, the quality metric generated without errors may be assigned a metric of "100" but the multimedia segments generated by the first server 1404A may have a lower metric regardless of the multimedia input. The low segment metrics may trigger an asynchronous segment polisher workflow to enhance the segments, such as by utilizing an event-driven platform as in the manner previously described in connection with FIGS. 7-12. In addition or alternatively, an event-driven platform may be used to invoke a quality control service 1408 to perform an audit of quality control information that was recorded to diagnose what caused the low-quality frame. An event trigger for running the quality control service may be a series of multimedia segments being generated with a low quality metric. The quality control service 1408 may be run via the event-driven platform and receive the low-quality segment and/or quality control information entry related to the segment.

The quality control service 1408 may access the logging system 1404 and retrieve a collection of quality control information entries for segments that were transcoded before and/or after. By inspecting a cross-section of quality control information entries that includes other segments transcoded by the same machine around the same time, the quality control service 1408 may make a determination that a series of low quality metrics indicates that the computing environment may have an issue—the server may have degraded performance due to various factors such as malware running on the system, a memory leak that causes less RAM to be available to the system than otherwise would be expected, orphaned threads, and software bugs that may be difficult to reproduce except under very specific circumstances. Thus, by examining a set of quality control entries sharing a common characteristic—in this case, segments transcoded by a particular machine—the quality control service 1408 may detect a series of decreasing quality metrics and determine that the root cause issue of the degradation may be related to a condition specific to that particular machine. The quality control service 1408 may send a notification to a console 1410 that may be used to notify an administrator of an issue. In some cases, the quality control service 1408 may be able to root cause which among several potential issues is causing the degradation of performance (e.g., the quality control service 1408 may run anti-virus software to detect and remove malware) and notifies the administrator that the problem was found and no further action is needed. In other cases, the system administrator may be notified of the degradation in general terms and may be able to investigate further to determine the root cause issue of the degradation.

As a second example, the second server 1404B may generate a second multimedia output stream 1414 having decreasing quality metrics. The quality control service 1408 may be invoked by an event-driven platform in response to detecting a segment having a low quality metric or a series of low-quality segments. In this case, the quality control service 1408 may determine, based on a cross-section of quality control information entries of prior and/or later segments transcoded by the server 1404B that the quality of segments generated by the server 1404B is degrading over time. The root cause issue may be a memory leak that is gradually consuming more and more memory over time or may be related to an expected degradation of computer hardware performance over time. Thus, by examining a set of quality control entries sharing a common characteristic—in this case, a decrease in segment quality metrics over time—the quality control service 1408 may detect a series of decreasing quality metrics and determine that the root cause issue of the degradation may be related to a condition specific to that particular machine. In some cases, the quality control service 1408 may evaluate whether the degradation is in line with expected degradation based on the operating lifespan of the server 1404B (which may also account for the level of intensity that the server was used) and determine that the server 1404B should be de-prioritized or retired. As a third example, the third server 1404C may generate a third multimedia output stream 1416 in which there are intermittent failures that cause transcoding errors. A quality control service 1408 may evaluate a cross-section of quality control information entries that includes other log entries having the same transcoding errors from the same machine and determine that the errors are all related—for example, a transcoder may output the same error code for each—and notify a system administrator or diagnosis expert of the error code. Such an error may, for example, be caused by a memory corruption. Additionally, the internal state of the transcoding operation may be preserved, such as the input multimedia that caused the error, a memory dump, a snapshot of the computing resource that performed the transcoding operation (e.g., a virtual machine instance), and more.

Figure 15:
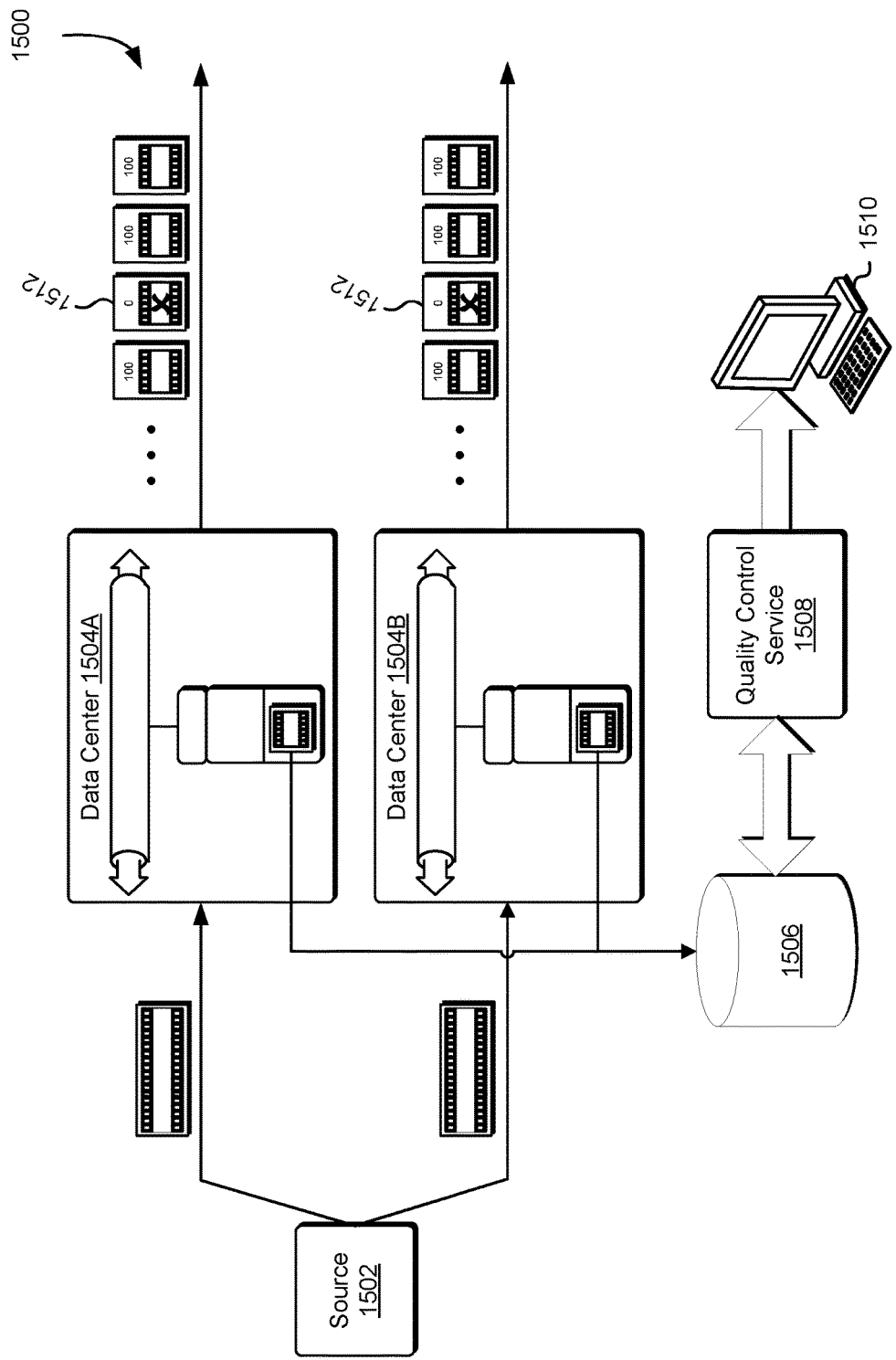
FIG. 15 illustrates additional environments in which a quality control service may be configured to detect abnormal operations.

FIG. 15 illustrates an environment in which various embodiments can be implemented and provides examples of abnormal conditions that may be detected by a quality control service. The computing environment 1500 illustrates a multimedia source 1502; data center 1504A and 1504B; a logging system 1506; a quality control service 1508; and a console 1510. Various techniques may be practiced in the computing environment 1500 for monitoring the quality of multimedia segments generated by computing resources of the data center. In such a system, it may be desirable to implement a quality control service that may be used to detect and root cause issues that can cause degradation of services such as transcoding services.

The source 1502 illustrated in FIG. 15 may be a multimedia source such as video, audio, data, or a combination thereof and may be in accordance with those described elsewhere in this disclosure, such as in connection with FIGS. 1-12. The source 1502 may provide copies of a multimedia input to data centers 1504A and 1504B. The data centers 1504A and 1504B may be used to transcode redundant segments of the same underlying content that utilize techniques described elsewhere in this disclosure for improving a viewer's multimedia experience. The data centers 1504A and 1504B may be in different geolocations.

In some embodiments, quality control information entries from transcoders in multiple regions may be stored in a logging system 1506. The logging system may be in accordance with those described elsewhere in this disclosure. In response to detecting transcoding errors 1512, an event-driven platform may invoke a quality control service 1508 to perform analyses on what may have triggered the error. The quality control service 1508 may be in accordance with those described elsewhere in this disclosure in connection with FIGS. 13-14. In some embodiments, the quality control service 1508 is invoked in response to a transcoding failure (e.g., the transcoding failure related to the segment transcoded by the server in the first data center 1504A). The quality control service 1508 may obtain a cross-section of quality control information entries that includes entries having the same error code and detect that the same transcoding error was generated by a second server in a second data center 1504B on the same underlying content as in the first case. Thus, the quality control center 1508 determines that the error was related to the multimedia input, and may generate a notification that is dispatched to a console 1510 so as to alert a visual quality expert, system administrator, media developer, etc., as to the error. In some cases, the multimedia input received by both inputs may have been damaged; in other cases, a transcoding algorithm may have a bug that only manifests with certain multimedia inputs; and more. Thus, it may be desirable to implement a quality control service that may be used to detect and root cause issues that can cause degradation of services such as transcoding services.

Figure 16:
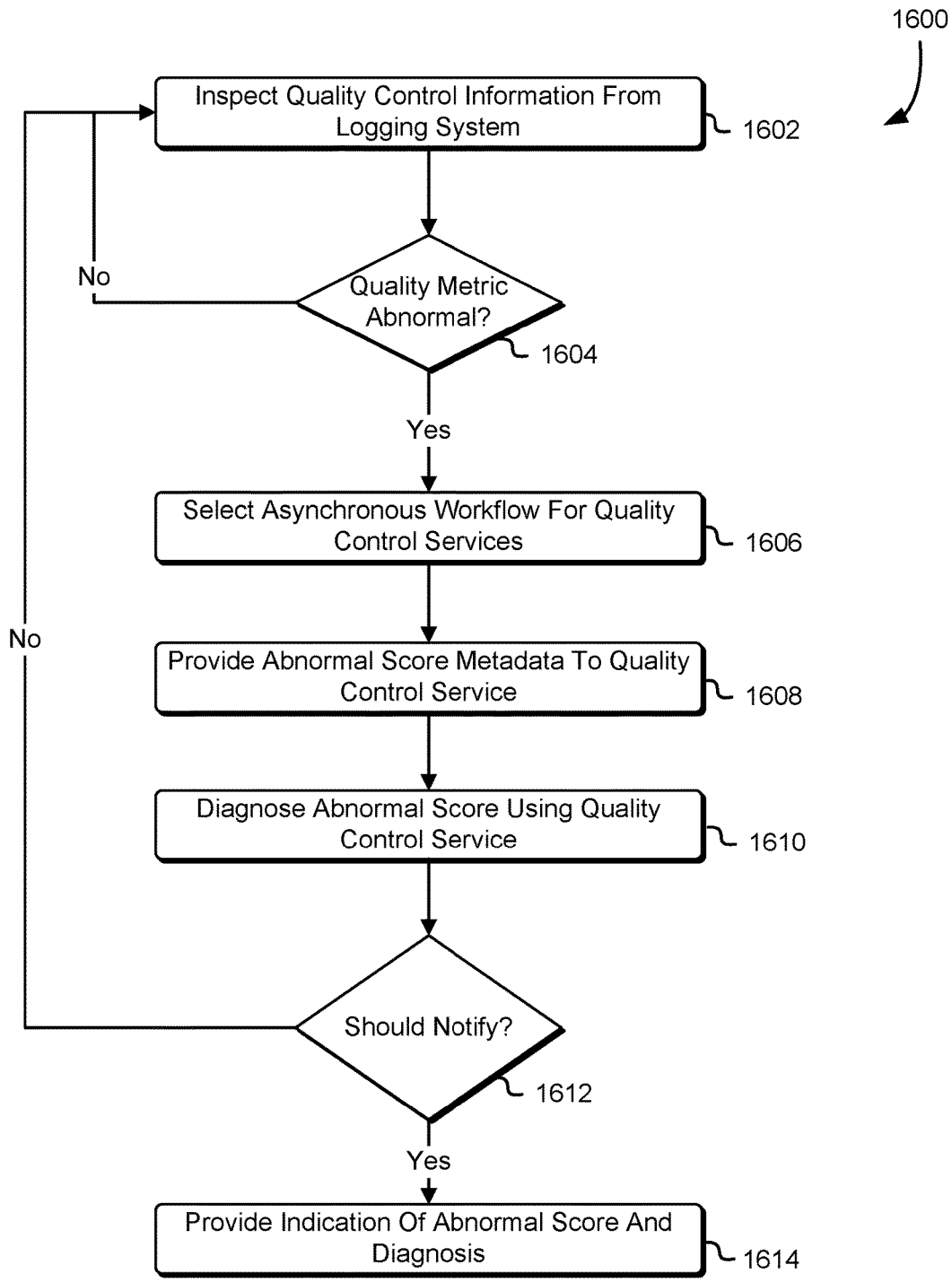
FIG. 16 illustrates a process for detecting abnormal operating conditions.

FIG. 16 shows an illustrative example of a process 1600 of an asynchronous workflow for detecting abnormal operating conditions. Generally, the process 1600 may be performed by any suitable system such as the event-driven platform described elsewhere in connection with FIGS. 7-12. In an embodiment, the process includes inspecting 1602 the quality control information entries from a logging system such as those described above in connection with FIGS. 13-15. In some embodiments, the system may monitor multimedia segments generated by transcoders of a larger environment (e.g., data centers). The segment may be a transcoded segment generated by a transcoder such as those described elsewhere in this disclosure. The system performing the process 1600 may use hardware, software, or a combination thereof to perform the process. In some embodiments, the process may be performed in a distributed environment, such as on a virtual machine instance running on a server that is in a data center configured to fulfill requests from multiple requestors (e.g., clients of the data center or service provider).

The system may check 1604 whether an abnormal quality metric is detected. In some cases, the check may be based on the segment quality metric of generated segments, but in other embodiments the system checks additional metadata of the segment to determine abnormal conditions. A system may also use a set of segment quality metrics to detect an abnormal condition, such as a time-series of segment quality metrics generated by a particular transcoder, the segment quality metrics of the same segment as transcoded by multiple transcoders across a system, and more. If the system detects an abnormal condition, in some embodiments it selects 1606 an asynchronous workflow associated with a quality control module and/or service. The quality control component may be implemented as a custom logic as part of an event-driven platform as described above in connection with FIGS. 8-9. The system may provide 1608 metadata associated with the abnormal metric to the quality control service. The metadata may be the quality control information associated with the low-quality segment, or may be a reference to the segment itself. In some cases, the metadata provided may be used by the quality control service to access the quality control information entry associated with the triggering segment from a logging system that includes more detailed information about what triggered the event (e.g., transcoding-related error codes).

The system may further diagnose 1610 the abnormal event using the quality control service, for example in the manner described above in connection with FIGS. 13-15. There are many different types of errors that may be detected, such as a consistently low quality metric which may be an indication of a memory leak, malware, bugs, or even that settings should be tweaked such that the transcoder is provided more computing resources. A gradually decreasing quality metric may indicate a growing memory leak, malware, bugs, or that the computer hardware running the transcoding operations is gradually losing its effectiveness and should be de-prioritized or retired. A system with intermittent transcoding errors may be subject to a software and/or hardware bug in the transcoder, operating system, and may be difficult to diagnose without a memory dump, snapshot of the machine's state (e.g., a snapshot of a virtual machine instance performing transcoding operations). A transcoding error that occurs with the same multimedia input across multiple machines (e.g., when transcoding redundant segments) may be an indication that the multimedia input has a problem, the transcoding algorithm has a bug related to the particular input, etc. In each of these cases, the quality control service may determine whether a notification should be provided to a system administrator. In some cases, the determination is based on whether there is actionable information, such as a memory dump or image snapshot that can be provided. In other cases, the type of error may indicate whether the notification should be generated. In general, if notifying a system administrator, visual quality expert, developer, etc., would be helpful to solving the abnormal condition, the system may provide 1614 an indication of the abnormal event. The notification may be made via a console such as a computing device and may include analysis that the quality control service has performed. For example, in the case of a gradually decreasing quality metric, the notification may include a set of diagnostics that was run, which may help root cause the issue faster. In this example, the quality control service may run anti-virus software to determine that a virus or malware is not taking cycles from the system, a memory diagnostics tool may be used to determine whether memory is being leaked, and a snapshot of the system may be taken and saved for inspection by the system administrator.

It should be noted that within the scope of this disclosure, providing multimedia and performing steps related to serving multimedia in real-time and under real-time performance constraints may refer to the ability to receive data, process the data, and provide the results within an allotted time. In some cases, real-time performance constraints may require that data be processed within a matter of tens or hundreds of milliseconds.

It should further be noted that for the purposes of this disclosure, transcoders have been used to illustrate many of the example embodiments. Encoders may, in principle, be used in place of transcoders where a system or component of a system receives an analog multimedia input rather than a digital multimedia input.

Figure 17:
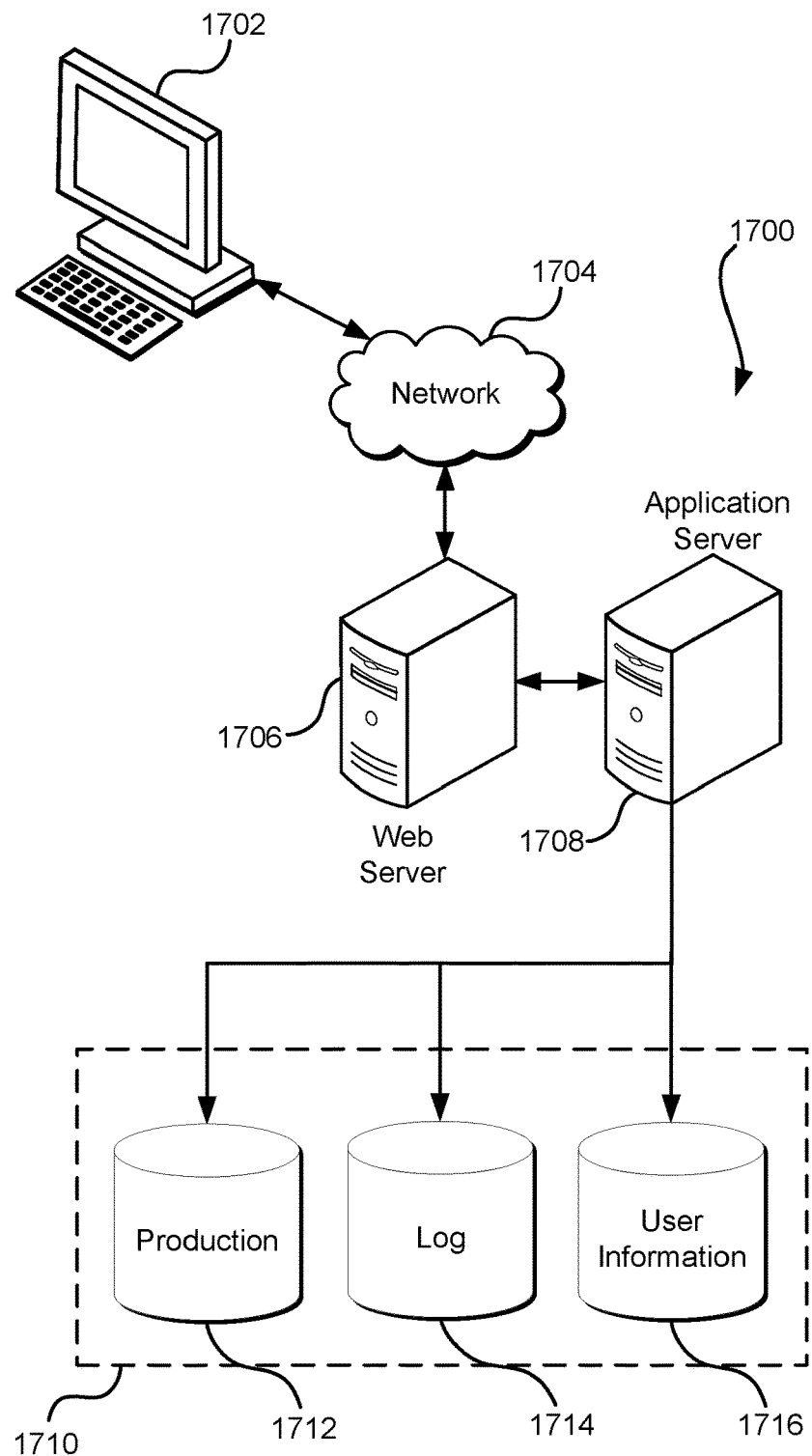
FIG. 17 illustrates an environment in which various embodiments can be implemented.

FIG. 17 illustrates aspects of an example environment 1700 for implementing aspects in accordance with various embodiments. As will be appreciated, although a web-based environment is used for purposes of explanation, different environments may be used, as appropriate, to implement various embodiments. The environment includes an electronic client device 1702, which can include any appropriate device operable to send and/or receive requests, messages, or information over an appropriate network 1704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1702 and the application server 1708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1710 can include several separate data tables, databases, data documents, dynamic data storage schemes and/or other data storage mechanisms and media for storing data relating to a particular aspect of the present disclosure. For example, the data store illustrated may include mechanisms for storing production data 1712 and user information 1716, which can be used to serve content for the production side. The data store also is shown to include a mechanism for storing log data 1714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. The application server 1708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors;
   memory that stores computer-executable instructions that, if executed, cause the system to:
      obtain a first multimedia stream comprising of a first plurality of multimedia segments in an encoding format and including segment quality metrics based at least in part on whether transcoding errors were detected during transcoding of segments of the first plurality;

obtain a second multimedia stream comprising of a second plurality of multimedia segments in the same encoding format and including segment quality metrics based at least in part on whether transcoding errors were detected during transcoding of segments of the second plurality;

generate a multimedia output stream comprising a third plurality of multimedia segments by selecting multimedia segments from either the first plurality or the second plurality, wherein a segment of the third plurality is selected based at least in part on comparing a first segment quality metrics of a particular segment of the first plurality and a second segment quality metric associated with a segment of the second plurality that corresponds to the particular segment of the first plurality, wherein the third plurality comprises a first segment of the first plurality and a second segment of the second plurality; and provide the multimedia output stream to another system.

2. The system of claim 1, wherein:

at least one multimedia segment of the third plurality comprises a plurality of frames having frame quality metrics based at least in part on whether transcoding errors were detected during transcoding of the plurality of frames; and the at least one multimedia segment of the third plurality has an associated segment quality metric that is based at least in part on the frame quality metrics of at least some of the plurality of frames.

3. The system of claim 1, wherein a segment of the first plurality has an associated manifest that includes the segment quality metric of the segment.

4. The system of claim 3, wherein:

the memory that stores the computer-executable instructions that, if executed, further causes the system to:

obtain a multimedia segment associated with the selected segment of the third plurality;

compare a third segment quality metric associated with the obtained multimedia segment with a fourth segment quality metric associated with the selected segment of the third plurality; and based at least in part on the comparing, modify the multimedia output stream by at least replacing the selected segment of the third plurality with the obtained segment; and the multimedia output stream is made available after the selected segment is replaced by the obtained segment.

5. A computer-implemented method, comprising:

obtaining, from a first transcoder, a first multimedia segment of a first plurality of multimedia segments associated with a multimedia input, wherein a first segment quality metric based at least in part on one or more errors detected by the first transcoder is associated with the first multimedia segment;

obtaining, from a second transcoder, a second transcoded multimedia segment of a second plurality of multimedia segments associated with the multimedia input, wherein a second segment quality metric based at least in part on one or more errors detected by the second transcoder is associated with the second multimedia segment, and further wherein the first multimedia segment and the second multimedia segment share a same encoding format;

selecting, between the first multimedia segment and the second multimedia segment, an output segment based at least in part on the first segment quality metric and the second segment quality metric; and generating a multimedia output stream comprising a third plurality of multimedia segments and based at least in part on the output segment, wherein the multimedia output stream comprises multimedia segments from both the first plurality and the second plurality.

6. The computer-implemented method of claim 5, wherein the first multimedia segment comprises a plurality of frames having frame quality metrics based at least in part on whether transcoding errors were detected during transcoding of the plurality of frames; and the first multimedia segment has an associated segment quality metric that is based at least in part on the frame quality metrics of at least some of the plurality of frames.

7. The computer-implemented method of claim 5, wherein a manifest is associated with the first multimedia segment, the manifest comprising information that includes:

the first segment quality metric; and the one or more errors detected by the first transcoder.

8. The computer-implemented method of claim 7, wherein the one or more errors includes: an input data error; a frame error; a decoding error; or a volume error.

9. The computer-implemented method of claim 5, wherein the method further comprises:

obtaining another multimedia segment associated with the output segment;

comparing a third segment quality metric associated with the another multimedia segment with a fourth segment quality metric associated with the output segment; and based at least in part on the comparing, modifying the multimedia output stream by at least replacing the output segment with the another segment; and wherein the multimedia output stream is made available after the selected segment is replaced by the obtained segment.

10. The computer-implemented method of claim 9, wherein:

selecting the output segment occurs after waiting a predetermined period of time; and the another multimedia segment is obtained after the predetermined period of time.

11. The computer-implemented method of claim 5, wherein the first transcoder and the second transcoder are located in different locations.

12. The computer-implemented method of claim 5, wherein selecting the output segment includes selecting which of the first multimedia segment and the second multimedia segment has a higher segment quality metric.

13. A non-transitory computer-readable storage medium comprising executable instructions that, as a result of being executed by one or more processors of a computer system, cause the computer system to:

obtain, from a first transcoder, a first multimedia segment of a first plurality of multimedia segments associated with a multimedia input, wherein a first segment quality metric based at least in part on one or more errors detected by the first transcoder is associated with the first multimedia segment;

obtain, from a second transcoder, a second transcoded multimedia segment of a second plurality of multimedia segments associated with the multimedia input, wherein a second segment quality metric based at least in part on one or more errors detected by the second transcoder is associated with the second multimedia segment, and further wherein the first multimedia segment and the second multimedia segment share a same encoding format;

select, between the first multimedia segment and the second multimedia segment, an output segment based at least in part on the first segment quality metric and the second segment quality metric; and generate a multimedia output stream comprising a third plurality of multimedia segments and based at least in part on the output segment, wherein the multimedia output stream comprises multimedia segments from both the first plurality and the second plurality.

14. The non-transitory computer-readable storage medium of claim 13, wherein the instructions to select the output segment include instructions that, as a result of being executed by the one or more processors, cause the system to select the output segment with a predetermined period of time.

15. The non-transitory computer-readable storage medium of claim 13, wherein the first segment quality metric is calculated based at least in part on determining whether a transcoding error was detected as part of transcoding the first multimedia segment.

16. The non-transitory computer-readable storage medium of claim 13, wherein the instructions to select the output segment include instructions that, as a result of execution by the one or more processors, cause the computer system to compare at least one of the first segment quality metric and the second segment quality metric against a threshold value.

17. The non-transitory computer-readable storage medium of claim 13, wherein the first multimedia segment comprises a plurality of frames, one or more frames of the plurality of frames including metadata indicating a transcoding success or a transcoding error.

18. The non-transitory computer-readable storage medium of claim 17, wherein the first segment quality metric is calculated based at least in part on frame quality metrics associated with the frames of the plurality, wherein the frame quality metrics are calculated based at least in part on the metadata included in the frames.

19. The non-transitory computer-readable storage medium of claim 13, wherein the instructions to select the output segment include instructions that, as a result of execution by the one or more processors, cause the computer system to select a highest segment quality metric among two or more segment quality metrics.

20. The non-transitory computer-readable storage medium of claim 13, wherein the instructions to select the output segment include instructions that, as a result of execution by the one or more processors, cause the computer system to:

obtain an identifier associated with the first multimedia segment; and obtain the first segment quality based at least in part on the identifier.

* * * * *